(12) United States Patent
Guha et al.

(10) Patent No.: US 7,380,060 B2
(45) Date of Patent: May 27, 2008

(54) BACKGROUND PROCESSING OF DATA IN A STORAGE SYSTEM

(75) Inventors: Aloke Guha, Louisville, CO (US);
Christopher T. Santilli, Colorado Springs, CO (US)

(73) Assignee: Copan Systems, Inc., Longmont, CO (US)

(*) Notice: Subject to any disclaimer, the term of this patent is extended or adjusted under 35 U.S.C. 154(b) by 0 days.

(21) Appl. No.: 11/716,338

(22) Filed: Mar. 9, 2007

(65) Prior Publication Data

US 2007/0260815 A1 Nov. 8, 2007

Related U.S. Application Data

(63) Continuation of application No. 11/108,077, filed on Apr. 14, 2005, now Pat. No. 7,210,004, which is a continuation-in-part of application No. 10/607,932, filed on Jun. 26, 2003, now Pat. No. 7,035,972.

(60) Provisional application No. 60/407,299, filed on Sep. 3, 2002.

(51) Int. Cl.
*G06F 12/00* (2006.01)

(52) U.S. Cl. .................. 711/114; 711/4; 711/111; 711/154; 713/324

(58) Field of Classification Search ............ 711/114, 711/4, 111, 154; 713/324
See application file for complete search history.

(56) References Cited

U.S. PATENT DOCUMENTS

| | | |
|---|---|---|
| 4,467,421 A | 8/1984 | White |
| 5,088,081 A | 2/1992 | Farr |
| 5,438,674 A | 8/1995 | Keele et al. |
| 5,530,658 A | 6/1996 | Hafner et al. |
| 5,557,183 A | 9/1996 | Bates et al. |
| 5,666,538 A | 9/1997 | DeNicola |
| 5,680,579 A | 10/1997 | Young et al. |
| 5,720,025 A | 2/1998 | Wilkes et al. |
| 5,787,462 A | 7/1998 | Hafner et al. |
| 5,805,864 A | 9/1998 | Carlson et al. |
| 5,828,583 A | 10/1998 | Bush et al. |
| 5,913,927 A | 6/1999 | Nagaraj et al. |
| 5,917,724 A | 6/1999 | Brousseau et al. |
| 5,961,613 A | 10/1999 | DeNicola |

(Continued)

OTHER PUBLICATIONS

Asaca/Shibasoku Corp of America, publication DM200', 1 page from www.asaca.com/DVL/DM_200.htm, Oct. 7, 2003.

(Continued)

*Primary Examiner*—Stephen Elmore
(74) *Attorney, Agent, or Firm*—Charles J. Kulas; Brian N. Young; Trellis I.P. Law Group, PC

(57) ABSTRACT

A method for processing data on a particular storage device in a plurality of storage devices is disclosed. A system and a computer program product for processing data on a particular storage device in a plurality of storage devices are also disclosed. All the storage devices from among the plurality of storage devices are not powered-on at the same time. A storage device, which is powered-off is selected for background processing. Further, a data-enhancing operation is selected. The selected storage device is powered on and the selected data-enhancing operation is processed on the storage device.

25 Claims, 24 Drawing Sheets

U.S. PATENT DOCUMENTS

| | | | |
|---|---|---|---|
| 6,078,455 A | 6/2000 | Enarson et al. | |
| 6,128,698 A | 10/2000 | Georgis | |
| 6,192,481 B1* | 2/2001 | Deenadhayalan et al. | ... 713/324 |
| 6,449,725 B2* | 9/2002 | Deenadhayalan et al. | ... 713/324 |
| 6,600,614 B2 | 7/2003 | Lenny et al. | |
| 6,680,806 B2 | 1/2004 | Smith | |
| 6,735,549 B2 | 5/2004 | Ridolfo | |
| 6,771,440 B2 | 8/2004 | Smith | |
| 6,957,291 B2 | 10/2005 | Moon et al. | |
| 6,982,842 B2 | 1/2006 | Jing et al. | |
| 6,986,075 B2 | 1/2006 | Ackaret et al. | |
| 7,035,972 B2* | 4/2006 | Guha et al. | ... 711/114 |
| 7,107,491 B2 | 9/2006 | Graichen et al. | |
| 7,210,005 B2 | 4/2007 | Guha et al. | |
| 7,266,668 B2 | 9/2007 | Hartung et al. | |
| 2002/0007464 A1 | 1/2002 | Fung | |
| 2002/0062454 A1 | 5/2002 | Fung | |
| 2002/0144057 A1* | 10/2002 | Li et al. | ... 711/112 |
| 2003/0196126 A1 | 10/2003 | Fung | |
| 2003/0200473 A1* | 10/2003 | Fung | ... 713/320 |
| 2004/0006702 A1 | 1/2004 | Johnson | |
| 2004/0111251 A1 | 6/2004 | Trimmer et al. | |
| 2004/0153614 A1 | 8/2004 | Bitner et al. | |
| 2005/0060618 A1 | 3/2005 | Guha | |
| 2005/0177755 A1 | 8/2005 | Fung | |
| 2005/0210304 A1 | 9/2005 | Hartung | |
| 2006/0053338 A1 | 3/2006 | Cousins | |
| 2006/0090098 A1 | 4/2006 | Le | |
| 2007/0220316 A1 | 9/2007 | Guha | |

OTHER PUBLICATIONS

Colarelli et al., The Case for Massive Arrays of Idle Disks (MAID), Dept of Computer Science, Univ. of Colorado, Boulder, pp. 1-6, Jan. 7, 2002.

Patterson et al., "A Case for Redundant Arrays of Inexpensive Disks (RAID)," ACM, pp. 109-116, 1998.

Chase et al., "Managing Energy and Server Resources in Hosting Centers," Dept of Computer Science, Duke University, pp. 14, Oct. 2001.

Calce and the University of Maryland; Reliability of Hard Disk Drives (HDD); © 2003; pp. 1-2; www.calce.umd.edu.

Herbst, Jim; SMART Specification For Seagate Technology Desktop and Mobile Drives Version 2.28; Apr. 23, 2003; pp. 1-36.

S.M.A.R.T Design Desktop HDD Development IDE HDD Development Storage M & D; Jul. 12, 2002; IBM Corporation.

Weikal, Adam et al.; Maxtor Self-Monitoring, Analysis and Reporting Technology/ Drive Self Test (SMART/DST) User's Guide; Revision C; May 1, 2002; pp. 1-52.

* cited by examiner

| MDV attribute data (membership, state, shelf identifier) |
|---|
| Disk attribute data (vendor, serial number, state, RAIDset membership) |
| RAIDset attribute data (RAIDset UUID, state, RAIDset membership, capacity, Volume UUID) |
| Volume attribute data (Volume UUID, state, rights, owners, capacity, RAIDset UUID) |
| Volume 0 (Volume UUID, WRITE cache, READ cache, bad block table) |
| Volume 1 (Volume UUID, WRITE cache, READ cache, bad block table) |
| • • • |
| Volume n (Volume UUID, WRITE cache, READ cache, bad block table) |

Fig. 7 coherent -2 : This indicates that the parity represents the 2 data drivers
coherent -1 : This indicates that the parity represents just 1 data driver

BACKGROUND PROCESSING OF DATA IN A STORAGE SYSTEM

CROSS-REFERENCE TO RELATED APPLICATION

This application is a continuation of the following application, which is incorporated by reference, as if it is set forth in full in this specification:

U.S. patent application Ser. No. 11/108,077, now U.S. Pat. No. 7,210,004, entitled 'METHOD AND SYSTEM FOR BACKGROUND PROCESSING OF DATA IN A STORAGE SYSTEM', filed on Apr. 14, 2005 issued Apr. 24, 2007, which is a continuation-in-part of the following application, which is hereby incorporated by reference, as if it is set forth in full in this specification:

U.S. patent application Ser. No. 10/607,932, now U.S. Pat. No. 7,035,972, entitled 'Method and Apparatus for Power-Efficient High-Capacity Scalable Storage System', filed on Jun. 26, 2003 issued Apr. 25, 2007, which claims priority to U.S. Provisional Application Ser. No. 60/407,299, entitled 'Method and Apparatus for Power-Efficient High-Capacity Scalable Storage System' filed on Sep. 3, 2002.

This application is related to the following applications, which are hereby incorporated by reference, as if it is set forth in full in this specification:

U.S. patent application Ser. No. 10/996,086; now U.S. Pat. No. 7,266,668, 'Method and System for Accessing a Plurality of Storage Devices', filed on Nov. 22, 2004 issued Sep. 4, 2007 and U.S. patent application Ser. No. 11/043,449 'Method and System for Disk Drive Exercise and Maintenance of High-Availability Storage Systems', filed Jan. 25, 2005.

BACKGROUND

The present invention relates generally to data storage systems. More specifically, the present invention relates to background processing of data in data storage systems.

Data, stored in large volumes, requires the use of large-scale and high-capacity storage systems. The large volumes of data occupy large storage space. This can create non-optimal usage of the available storage space. Additionally, large volumes of data not used for long periods of time can become corrupted, and may not be available when needed. Processing time and other resources may be required for searching large volumes of data. These considerations can be more complicated to deal with when a storage system uses devices that are not all powered-on at the same time.

SUMMARY

In accordance with one embodiment of the present invention, a method for processing data on a particular storage device in a plurality of storage devices, is provided, where all the storage devices are not powered-on at the same time. The method comprises selecting a data enhancing operation for data on the particular storage device, determining that the particular storage device is powered off, powering on the particular storage device, and performing the data enhancing operation on the particular storage device.

In another embodiment the invention provides, a system for processing data on a particular storage device in a plurality of storage devices, where all the storage devices are not powered-on at the same time. The system comprises a selection module for selecting a data-enhancing operation from a set of operations comprising compression, data-integrity check, data-reliability test, object index preparation, and content search, a power-check module for checking the power status on a storage device selected from the plurality of storage devices, an activation module for powering-on the selected storage device, a data-enhancing activation module for processing the selected data-enhancing operation.

In another embodiment the invention provides an apparatus for processing data on a particular storage device in a plurality of storage devices, where all the storage devices are not powered-on at the same time. The apparatus comprises a processor for executing instructions, a machine-readable medium including one or more instructions for selecting a data enhancing operation for data on the particular storage device, one or more instructions for determining that the particular storage device is powered off, one or more instructions for powering on the particular storage device, and one or more instructions for performing the data enhancing operation on the particular storage device.

In another embodiment the invention provides a computer-readable medium including instructions executable by a processor processing data on a particular storage device in a plurality of storage devices, where all the storage devices are not powered-on at the same time. The computer-readable medium comprises one or more instructions for selecting a data enhancing operation for data on the particular storage device, one or more instructions for determining that the particular storage device is powered off, one or more instructions for powering on the particular storage device, and one or more instructions for performing the data enhancing operation on the particular storage device.

BRIEF DESCRIPTION OF THE DRAWINGS

Various embodiments of the invention will hereinafter be described in conjunction with the appended drawings, provided to illustrate and not to limit the invention, wherein like designations denote like elements, and in which:

FIG. 7 is a diagram illustrating the structure of information stored on a metadata disk in accordance with one embodiment.

DESCRIPTION OF THE VARIOUS EMBODIMENTS

Figure 1:
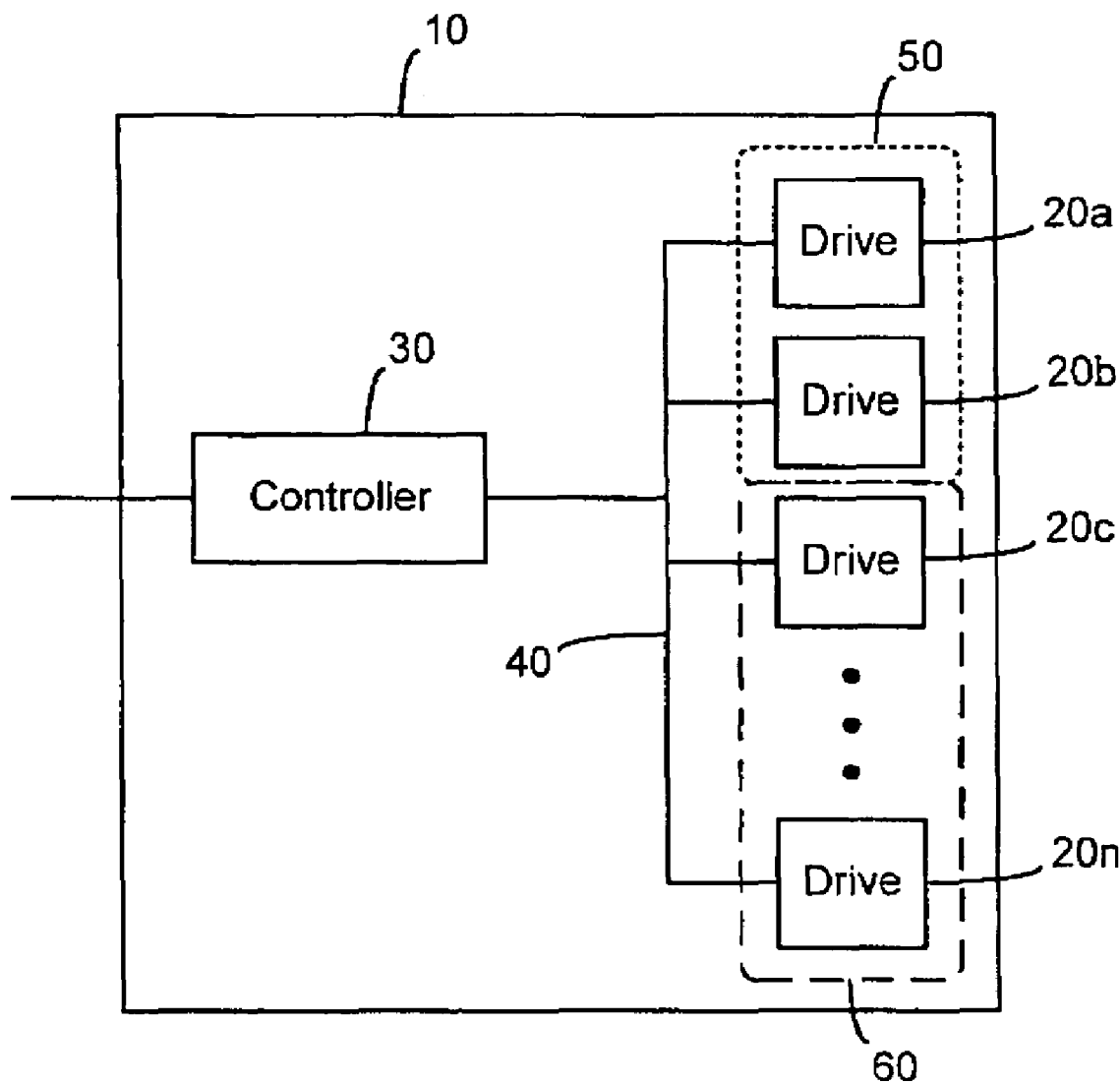
FIG. 1 is a diagram illustrating the general structure of a multiple-disk data storage system in accordance with one embodiment.

Embodiments of the invention are described below. It should be noted that these and any other embodiments described below are exemplary and are intended to be illustrative of the invention rather than limiting.

As described herein, various embodiments of the invention comprise systems and methods for providing scalable, reliable, power-efficient, high-capacity data storage, wherein data storage drives are individually powered on and off, depending upon their usage requirements.

In one embodiment, the invention is implemented in a RAID-type data storage system. This system employs a large number of hard disk drives. When data is written to the system, the data is written to one or more of the disk drives. Metadata and parity information corresponding to the data are also written to one or more of the disk drives to reduce the possibility of data being lost or corrupted. The manner in which data is written to the disks typically involves only one data disk at a time, with possible use of additional disks such as metadata and parity disks. Similarly, reads of data typically only involve one data disk at a time. Consequently, data disks which are not currently being accessed can be powered down. The system is therefore configured to individually control the power to each of the disks so that it can power up the subset of disks that are currently being accessed, while powering down the subset of disks that are not being accessed.

Because only a portion of the disk drives in the system are powered on at any given time, the power consumption of a power managed system can be less than a non-power managed system. As a result of the lower power consumption of the system, it generates less heat, requires less cooling and can be packaged in a smaller enclosure. In a system where most of the disk drives are powered down at any given time the data can be distributed by a simple fan-out interconnection which consumes less power and takes up less volume within the system enclosure than other approaches to data distribution. Yet another difference between the present system and conventional systems is that, given a particular reliability (e.g., mean time to failure, or MTTF) of the individual disk drives, the present system can be designed to meet a particular reliability level (e.g., threshold mean time between failures, MTBF).

The various embodiments of the invention provide numerous advantages. These advantages are described below with respect to the different areas of impact. Other advantages may also be realized.

Power Management

In regard to power management, embodiments of the present invention may not only decrease power consumption, but also increase system reliability by optimally power cycling the drives. In other words, only a subset of the total number of drives is powered on at any time. Consequently, the overall system reliability can be designed to be above a certain acceptable threshold.

The power cycling of the drives on an individual basis is one feature that distinguishes the present embodiments from conventional systems. As noted above, prior art multi-drive systems do not allow individual drives, or even sets of drives to be powered off in a deterministic manner during operation of the system to conserve energy. Instead, they teach the powering off of entire systems opportunistically. In other words, if it is expected that the system will not be used at all, the entire system can be powered down. During the period in which the system is powered off, of course, it is not available for use. By powering off individual drives while other drives in the system remain powered on, embodiments of the present invention provide power-efficient systems for data storage and enable such features as the use of closely packed drives to achieve higher drive density than conventional systems in the same footprint.

Data Protection

In regard to data protection, it is desirable to provide a data protection scheme that assures efficiency in storage overhead used while allowing failed disks to be replaced without significant disruption during replacement. This scheme must be optimized with respect to the power cycling of drives since RAID schemes will have to work with the correct subset of drives that are powered on at any time. Thus, any Read or Write operations must be completed in expected time even when a fixed set of drives are powered on. Because embodiments of the present invention employ a data protection scheme that does not use most or all of the data disks simultaneously, the drives that are powered off can be easily replaced without significantly disrupting operations.

Physical Packaging

In regard to the physical packaging of the system, most storage devices must conform to a specific volumetric constraint. For example, there are dimensional and weight limits that correspond to a standard rack, and many customers may have to use systems that fall within these limits. The embodiments of the present invention use high density packing and interconnection of drives to optimize the physical organization of the drives and achieve the largest number of drives possible within these constraints.

Storage Transaction Performance

In regard to storage transaction performance, the power cycling of drives results in a limited number of drives being powered on at any time. This affects performance in two areas. First, the total I/O is bound by the number of powered drives. Second, a random Read operation to a block in a powered down drive would incur a very large penalty in the spin-up time. The embodiments of the present invention use large numbers of individual drives, so that the number of drives that are powered on, even though it will be only a fraction of the total number of drives, will allow the total I/O to be within specification. In regard to the spin-up delay, the data access scheme masks the delay so that the host system does not perceive the delay or experience a degradation in performance.

Figure 2A:
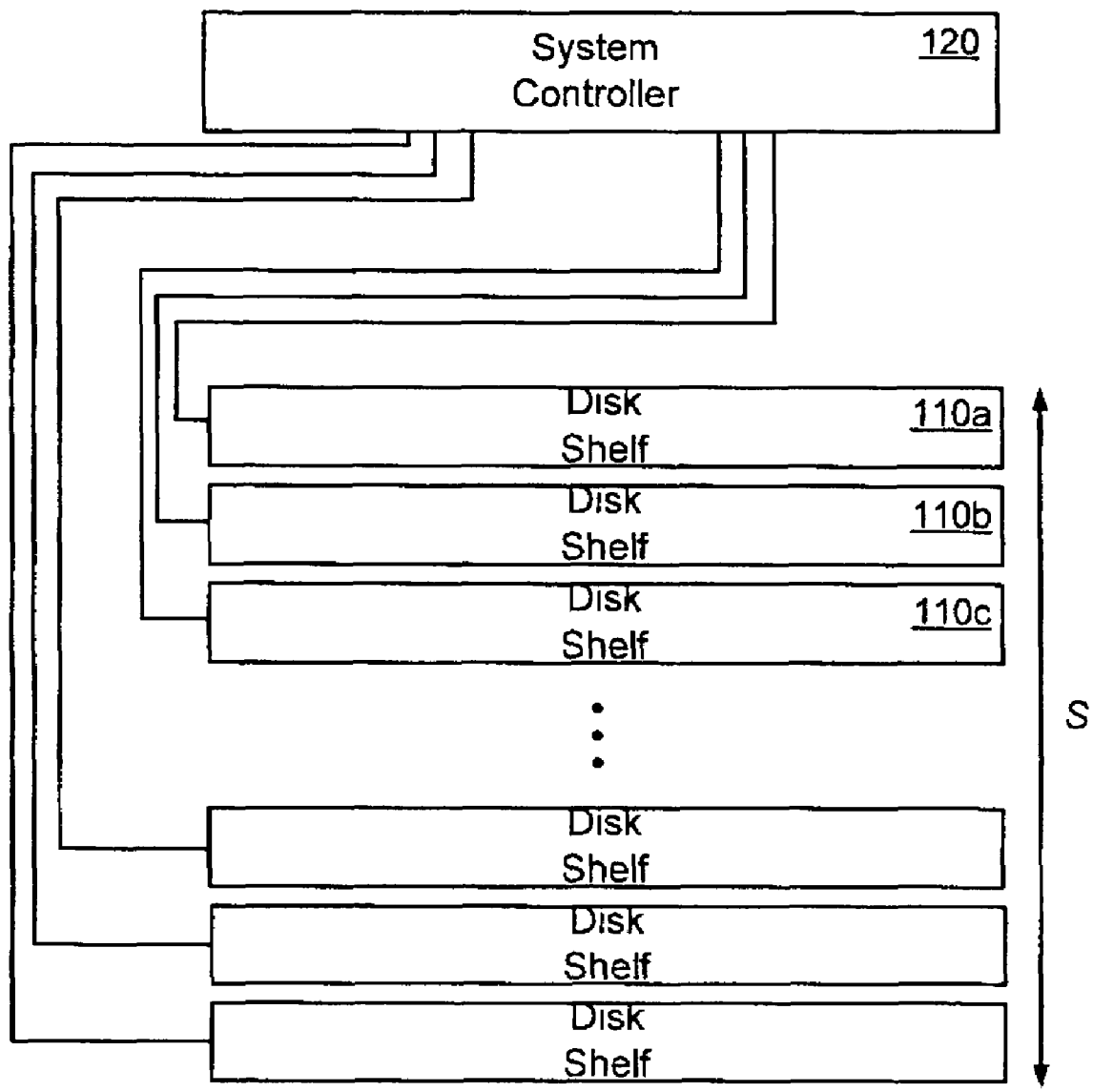
FIGS. 2A and 2B are diagrams illustrating the interconnections between the controllers and disk drives in a densely packed data storage system in accordance with one embodiment.
Figure 2B:
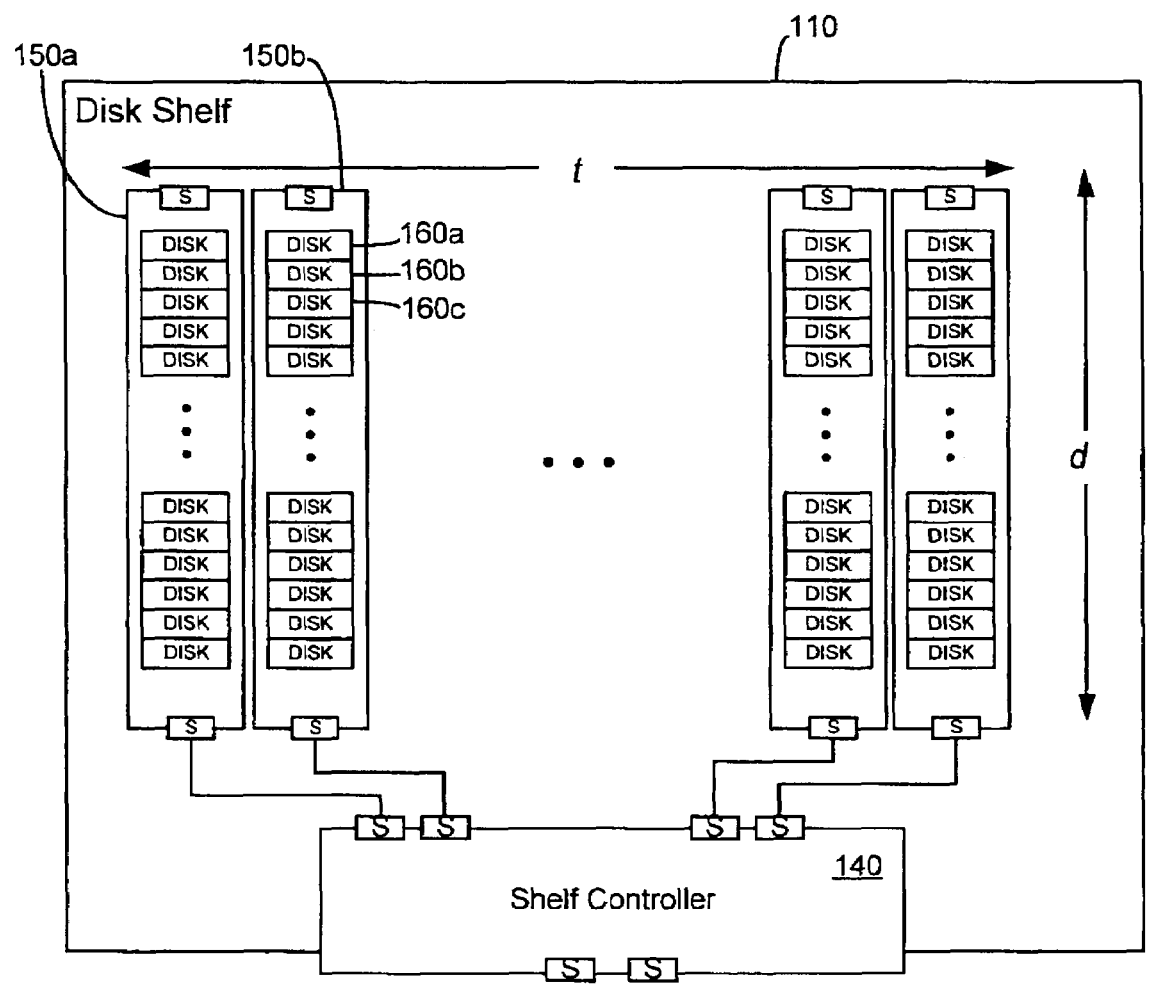

Referring to FIG. 1, a diagram illustrating the general structure of a multiple-disk data storage system in accordance with one embodiment of the invention is shown. It should be noted that the system illustrated in FIG. 1 is a very simplified structure which is intended merely to illustrate one aspect (power cycling) of an embodiment of the invention. A more detailed representation of a preferred embodiment is illustrated in FIG. 2 and the accompanying text below.

As depicted in FIG. 1, data storage system 10 includes multiple disk drives 20. It should be noted that, for the purposes of this disclosure, identical items in the figures may be indicated by identical reference numerals followed by a lowercase letter, e.g., 20a, 20b, and so on. The items may be collectively referred to herein simply by the reference numeral. Each of disk drives 20 is connected to a controller 30 via interconnect 40.

It can be seen in FIG. 1 that disk drives 20 are grouped into two subsets, 50 and 60. Subset 50 and subset 60 differ in that the disk drives in one of the subsets (e.g., 50) are powered on, while the disk drives in the other subset (e.g., 60) are powered down. The individual disk drives in the system are powered on (or powered up) only when needed. When they are not needed, they are powered off (powered down). Thus, the particular disk drives that make up each subset will change as required to enable data accesses (reads and writes) by one or more users. This is distinctive because, as noted above, conventional data storage (e.g., RAID) systems only provide power cycling of the entire set of disk drives—they do not allow the individual disk drives in the system to be powered up and down as needed.

As mentioned above, the system illustrated by FIG. 1 is used here simply to introduce the power cycling aspect of one embodiment of the invention. This and other embodiments described herein are exemplary and numerous variations on these embodiments may be possible. For example, while the embodiment of FIG. 1 utilizes multiple disk drives, other types of data storage, such as solid state memories, optical drives, or the like could also be used. It is also possible to use mixed media drives, although it is contemplated that this will not often be practical. References herein to disk drives or data storage drives should therefore be construed broadly to cover any type of data storage. Similarly, while the embodiment of FIG. 1 has two subsets of disk drives, one of which is powered on and one of which is powered off, other power states may also be possible. For instance, there may be various additional states of operation (e.g., standby) in which the disk drives may exist, each state having its own power consumption characteristics.

The powering of only a subset of the disk drives in the system enables the use of a greater number of drives within the same footprint as a system in which all of the drives are powered on at once. One embodiment of the invention therefore provides high density packing and interconnection of the disk drives. This system comprises a rack having multiple shelves, wherein each shelf contains multiple rows, or "sticks" of disk drives. The structure of this system is illustrated in FIG. 2

Referring to FIG. 2, the top-level interconnection between the system controller 120 and the shelves 110 is shown on the left side of the figure. The shelf-level interconnection to each of the sticks 150 of disk drives 160 is shown on the right side of the figure. As shown on the left side of the figure, the system has multiple shelves 110, each of which is connected to a system controller 120. Each shelf has a shelf controller 140, which is connected, to the sticks 150 in the shelf. Each stick 150 is likewise connected to each of the disk drives 160 so that they can be individually controlled, both in terms of the data accesses to the disk drives and the powering on/off of the disk drives. The mechanism for determining the optimal packing and interconnection configuration of the drives in the system is described below.

It should be noted that, for the sake of clarity, not all of the identical items in FIG. 2 are individually identified by reference numbers. For example, only a few of the disk shelves (110a-110c), sticks (150a-150b) and disk drives (160a-160c) are numbered. This is not intended to distinguish the items having reference numbers from the identical items that do not have reference numbers.

Let the number of drives in the system be N, where N is a large number.

N is then decomposed into a 3-tuple, such that N=s.t.d where s: number of shelf units in the system, typically determined by the physical height of the system. For example, for a 44U standard rack system, s can be chosen to be 8.

t: the number of "sticks" in the each shelf unit where a stick comprises a column of disks. For example, in a 24-inch-wide rack, t<=8.

d: the number of disk drives in each stick in a shelf. In a standard rack, d can be 14

Figure 3:
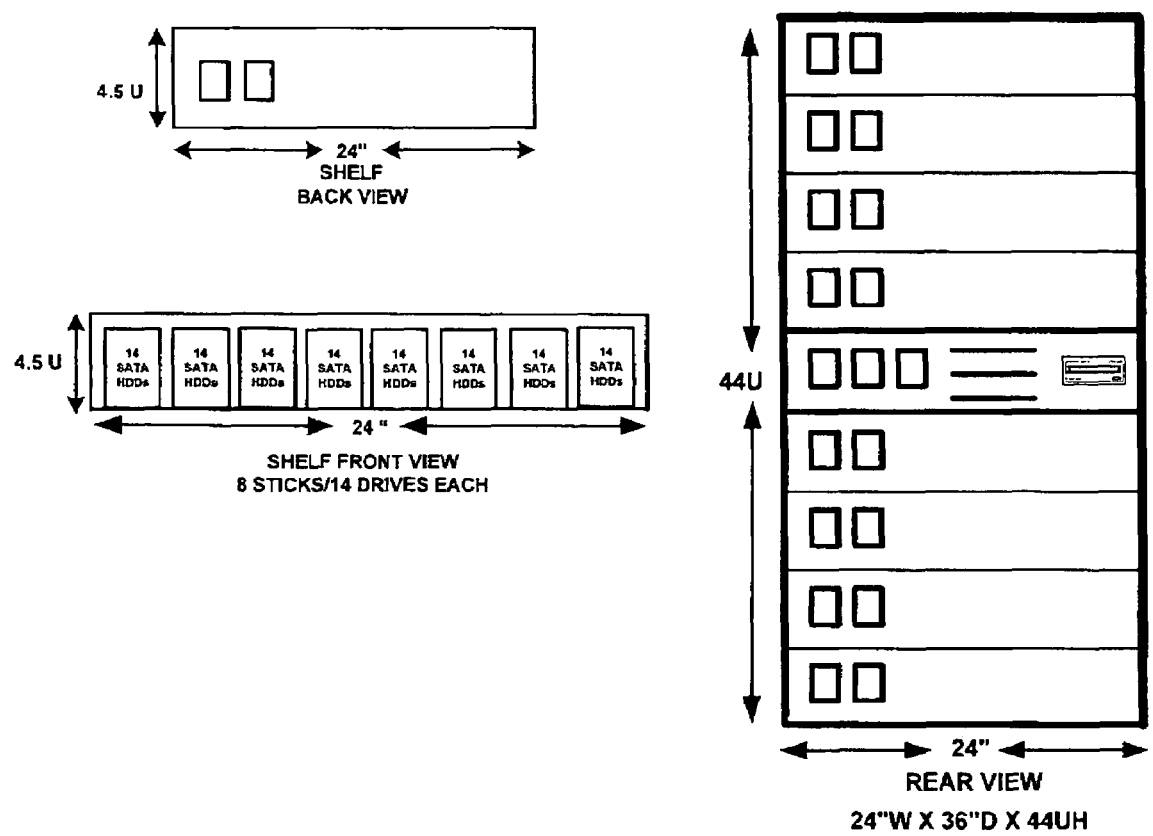
FIG. 3 is a diagram illustrating the physical configuration of a densely packed data storage system in accordance with one embodiment.

The configuration as shown in FIG. 2 is decomposed into shelves, sticks and disks so that the best close packing of disks can be achieved for purposes of maximum volumetric capacity of disk drives. One example of this is shown in FIG. 3. With the large racks that are available, nearly 1000 3.5" disks can be packed into the rack.

The preferred configuration is determined by the decomposition of N into s, t and d while optimizing with respect to the i) volume constraints of the drives and the overall system (the rack), and ii) the weight constraint of the complete system. The latter constraints are imposed by the physical size and weight limits of standard rack sizes in data centers.

Besides constraints on weight and dimensions, large-scale packing of drives must also provide adequate airflow and heat dissipation to enable the disks to operate below a specified ambient temperature. This thermal dissipation limit also affects how the disks are arranged within the system.

One specific implementation that maximizes the density of drives while providing sufficient air flow for heat dissipation is the configuration shown in FIG. 3.

Power Cycling of Drives to Increase System Reliability and Serviceability

One embodiment of the invention comprises a bulk storage or near-online (NOL) system. This storage system is a rack-level disk system comprising multiple shelves. Hosts can connect to the storage system via Fibre Channel ports on the system level rack controller, which interconnects to the shelves in the rack. Each shelf has a local controller that controls all of the drives in the shelf. RAID functionality is supported within each shelf with enough drives for providing redundancy for parity protection as well as disk spares for replacing failed drives.

In this embodiment, the system is power cycled. More particularly, the individual drives are powered on or off to improve the system reliability over the entire (large) set of drives. Given current known annualized failure rates (AFRs), a set of 1000 ATA drives would be expected to have a MTBF of about 20 days. In an enterprise environment, a drive replacement period of 20 days to service the storage system is not acceptable. The present scheme for power cycling the individual drives effectively extends the real life of the drives significantly. However, such power cycling requires significant optimization for a number of reasons. For example, power cycling results in many contact start-stops (CSSs), and increasing CSSs reduces the total life of the drive. Also, having fewer powered drives makes it difficult to spread data across a large RAID set. Consequently, it may be difficult to implement data protection at a level equivalent to RAID 5. Still further, the effective system bandwidth is reduced when there are few powered drives.

In one embodiment, the approach for determining the power cycling parameters is as shown in the flow diagram of FIG. 4 and as described below. It should be noted that the following description assumes that the disk drives have an exponential failure rate (i.e., the probability of failure is $1-e^{-\lambda t}$, where $\lambda$ is the inverse of the failure rate). The failure rates of disk drives (or other types of drives) in other embodiments may have failure rates that are more closely approximated by other mathematical functions. For such systems, the calculations described below would use the alternative failure function instead of the present exponential function.

With a large number of drives, N, that are closely packed into a single physical system, the MTTF of the system will grow significantly as N grows to large numbers.

If the MTTF of a single drive is f (typically in hours) where f=1/(failure rate of a drive) then the system MTBF, F, between failures of individual disks in the system is $$F=1/(1-(1-1/f)^{**}N)$$

For N=1000, and f=500,000 hrs or 57 years, F=22 days. Such low MTBF is not acceptable for most data centers and enterprises. As mentioned above, the system MTBF can be increased by powering the drives on and off, i.e., power cycling the drives, to increase the overall life of each drives in the system. This facilitates maintenance of the system, since serviceability of computing systems in the enterprise requires deterministic and scheduled service times when components (drives) can be repaired or replaced. Since it is desired to have scheduled service at regular intervals, this constraint is incorporated into the calculations that follow.

Let the interval to service the system to replace failed disk drives be T, and required the power cycling duty ratio be R.

The effective system MTBF is T, and the effective failure rate of the system is 1/T Then, the effective MTBF in a system of N disks is:

$$f^*=1/\{1-(1-1/T)^{**}1/N\}$$

Thus, we can compute the effective MTTF of disks in a large number of drives in a single system so that the service interval is T.

Since the actual MTTF is f, the approach we take is to power cycle the drives, i.e., turn off the drives for a length of time and then turn them on for a certain length of time.

If R is the duty ratio to meet the effective MTTF, then $$R=f/f^*<1$$

Thus, if the ON period of the drives is p hours, then the drives must be OFF for p/R hours.

Further, since at any one time only a subset of all drives are powered on, the effective number of drives in the system that are powered ON is R*N.

Thus, the ratio R of all drives at a shelf is also the number of drives that must be powered ON in total in each shelf. This also limits the number of drives that are used for data writing or reading as well as any other drives used for holding metadata.

There is one other constraint that must be satisfied in the power cycling that determines the ON period of p hours.

If the typical life of the drive is f hours (same as nominal MTTF), then the number of power cycling events for a drive is CSS (for contact start stops)

$$CSS=f/(p+p/R)$$

Since CSS is limited to a maximum CSSmax, for any drive $$CSS<CSSmax$$

Thus, p must be chosen such that CSSmax is never exceeded.

Figure 4:
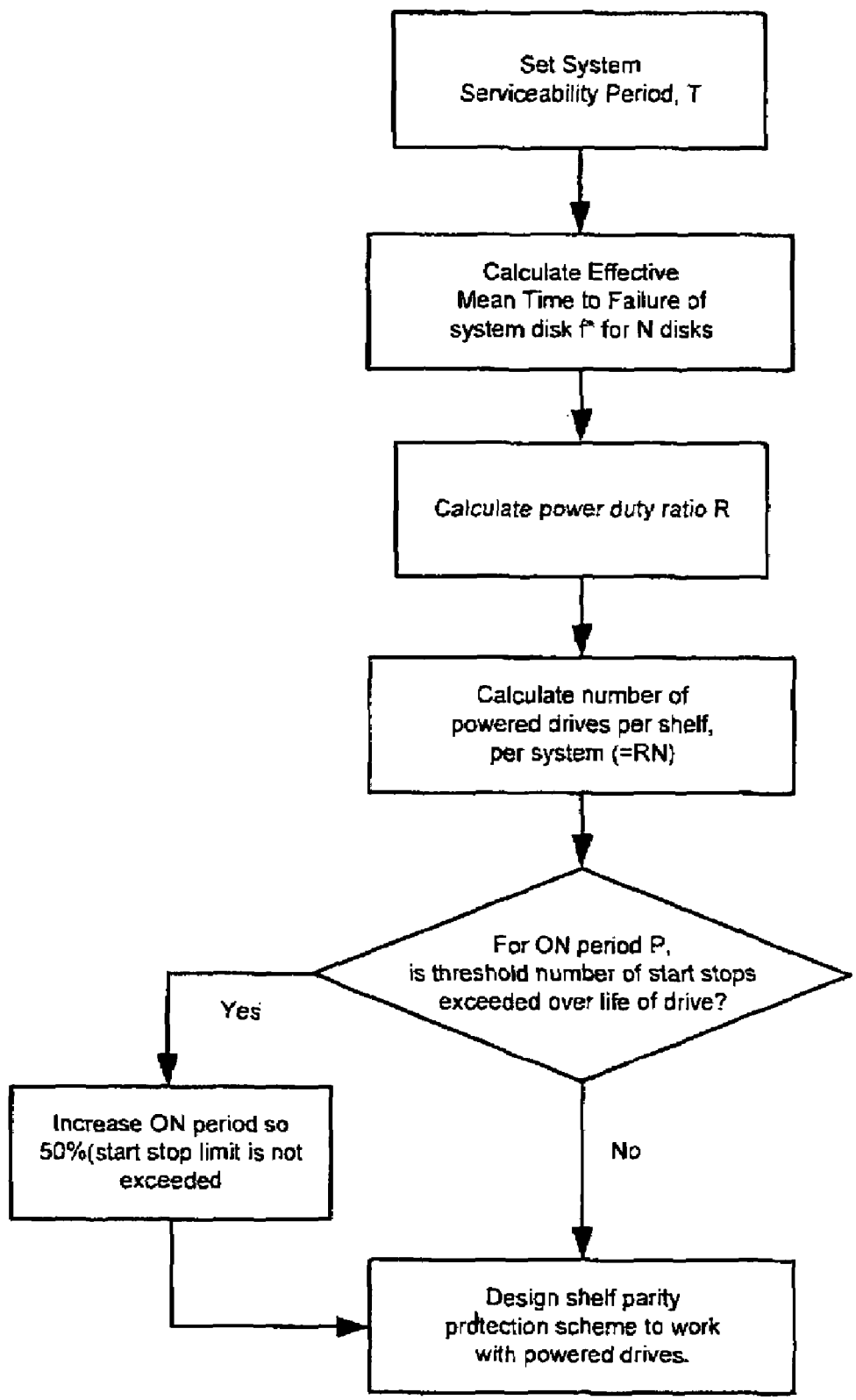
FIG. 4 is a flow diagram illustrating the manner in which the power management scheme of a densely packed data storage system is determined in accordance with one embodiment.

FIG. 4 depicts the flowchart for establishing power cycling parameters.

Efficient Data Protection Scheme for Near Online (NOL) System

In one embodiment, a new RAID variant is implemented in order to meet the needs of the present Power Managed system. To meet the serviceability requirement of the system, the power duty cycle R of the drives will be less than 100% and may be well below 50%. Consequently, when a data volume is written to a RAID volume in a shelf, all drives in the RAID set cannot be powered up (ON). The RAID variant disclosed herein is designed to provide the following features.

First, this scheme is designed to provide adequate parity protection. Further, it is designed to ensure that CSS thresholds imposed by serviceability needs are not violated. Further, the RAID striping parameters are designed to meet the needs of the workload patterns, the bandwidth to be supported at the rack level, and access time. The time to access the first byte must also be much better than tape or sequential media. The scheme is also designed to provide parity based data protection and disk sparing with low overhead.

There are a number of problems that have to be addressed in the data protection scheme. For instance, failure of a disk during a write (because of the increased probability of a disk failure due to the large number of drives in the system) can lead to an I/O transaction not being completed. Means to ensure data integrity and avoid loss of data during a write should therefore be designed into the scheme. Further, data protection requires RAID redundancy or parity protection. RAID operations, however, normally require all drives powered ON since data and parity are written on multiple drives. Further, Using RAID protection and disk sparing typically leads to high disk space overhead that potentially reduces effective capacity. Still further, power cycling increases the number of contact start stops (CSSs), so CSS failure rates increase, possibly by 4 times or more.

In one embodiment, there are 3 types of drives in each shelf: data and parity drives that are power cycled per schedule or by read/write activity; spare drives that are used to migrate data in the event of drive failures; and metadata drives that maintain the state and configuration of any given RAID set. A metadata drive contains metadata for all I/O operations and disk drive operational transitions (power up, power down, sparing, etc.). The data that resides on this volume is organized such that it provides information on the data on the set of disk drives, and also caches data that is to be written or read from drives that are not yet powered on. Thus, the metadata volume plays an important role in disk management, I/O performance, and fault tolerance.

The RAID variant used in the present system "serializes" writes to smallest subset of disks in the RAID set, while ensuring that CSS limits are not exceeded and that the write I/O performance does not suffer in access time and data rate.

Approach to RAID Variant

In applying data protection techniques, there are multiple states in which the set of drives and the data can reside. In one embodiment, the following states are used. Initialize— in this state, a volume has been allocated, but no data has been written to the corresponding disks, except for possible file metadata. Normal—in this state, a volume has valid data residing within the corresponding set of disk drives. This includes volumes for which I/O operations have resulted in the transferring of data. Data redundancy—in this state, a volume has been previously degraded and is in the process of restoring data redundancy throughout the volume. Sparing—in this state, a disk drive within a set is replaced.

Assumptions

When developing techniques for data protection, there are often tradeoffs made based on a technique that is selected. Two assumptions may be useful when considering tradeoffs. The first assumption is that this data storage system is not to achieve or approach the I/O performance of an enterprise online storage system. In other words, the system is not designed for high I/O transactions, but for reliability. The second assumption is that the I/O workload usage for this data storage is typically large sequential writes and medium to large sequential reads.

Set of Disk Drives Initialized

An initialized set of disk drives consist of a mapped organization of data in which a single disk drive failure will not result in a loss of data. For this technique, all disk drives are initialized to a value of 0.

Figure 5:
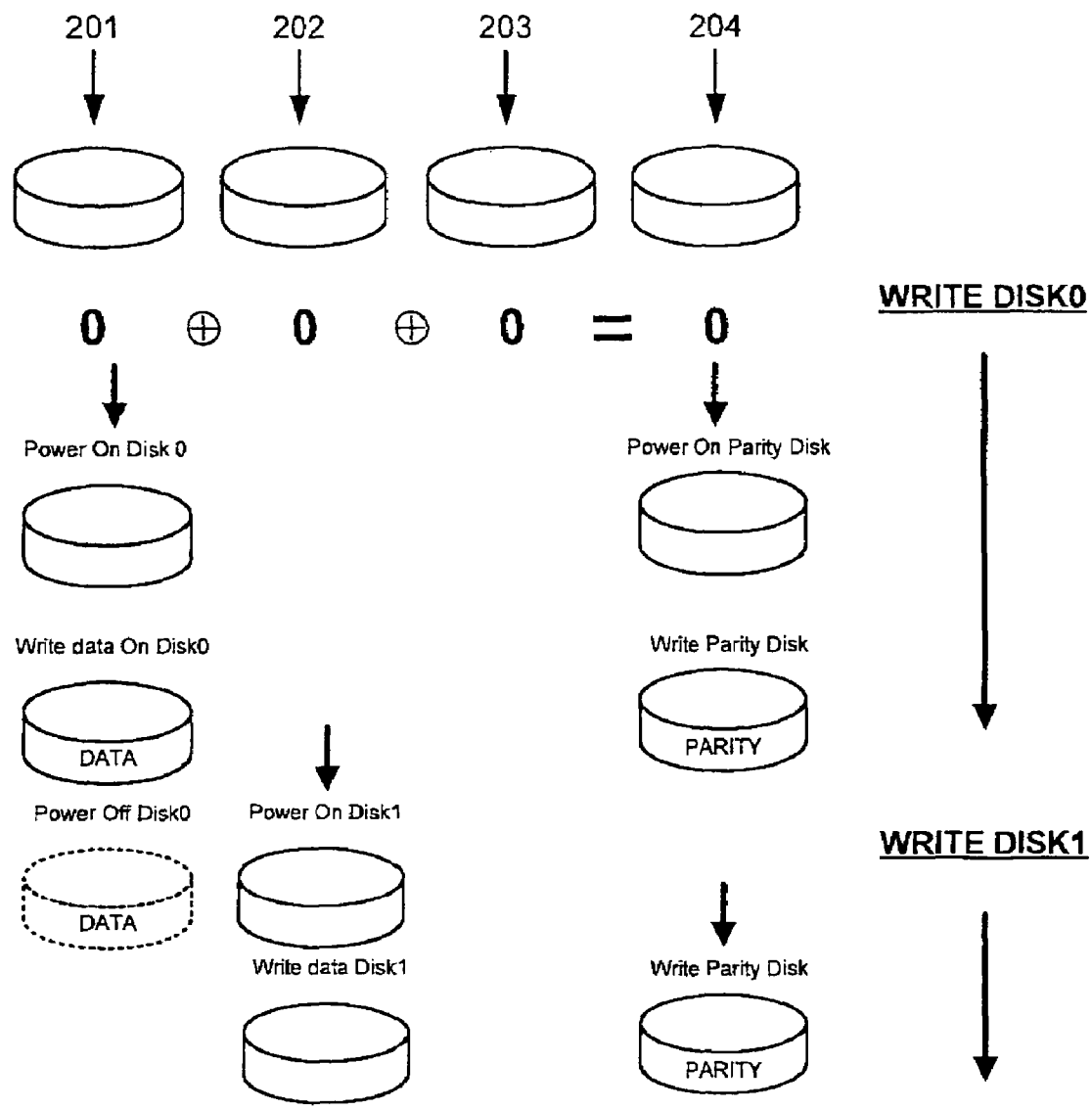
FIG. 5 is a diagram illustrating the manner in which information is written to a parity disk and the manner in which disk drives are powered on and off in accordance with one embodiment.

The presence of "zero-initialized" disk drives is used as the basis for creating a "rolling parity" update. For instance, referring to FIG. 5, in a set of 4 disk drives, 201-204, all drives (3 data and 1 parity) are initialized to "0". (It should be noted that the disk drives are arranged horizontally in the figure—each vertically aligned column represents a single disk at different points in time.) The result of the XOR computation denotes the result of the content of the parity drive ($0 \oplus 0 \oplus 0=0$). If data having a value of "5" is written to the first disk, 201, then the parity written to parity disk 204 would represent a "5" ($5 \oplus 0 \oplus 0=5$). If the next data disk (disk 202) were written with a value of "A", then the parity would be represented as "F" ($5 \oplus A \oplus 0=F$). It should be noted that, while the parity disk contains a value equal to the XOR'ing of all three data disks, it is not necessary to power on all of the disks to generate the correct parity. Instead, the old parity ("5") is simply XOR'ed with the newly written data ("A") to generate the new parity ("F"). Thus, it is not necessary to XOR out the old data on disk 202.

Metadata Volume

In order to maintain the state and configuration of a given RAID set in one embodiment, there exists a "metadata volume" (MDV). This volume is a set of online, operational disk drives, which may be mirrored for fault tolerance. This volume resides within the same domain as the set of disk drives. Thus, the operating environment should provide enough power, cooling, and packaging to support this volume. This volume contains metadata that is used for I/O operations and disk drive operational transitions (power up, power down, sparing, etc.). The data that resides on this volume is organized such that copies of subsets of data representing the data on the set of disk drives.

Figure 6:
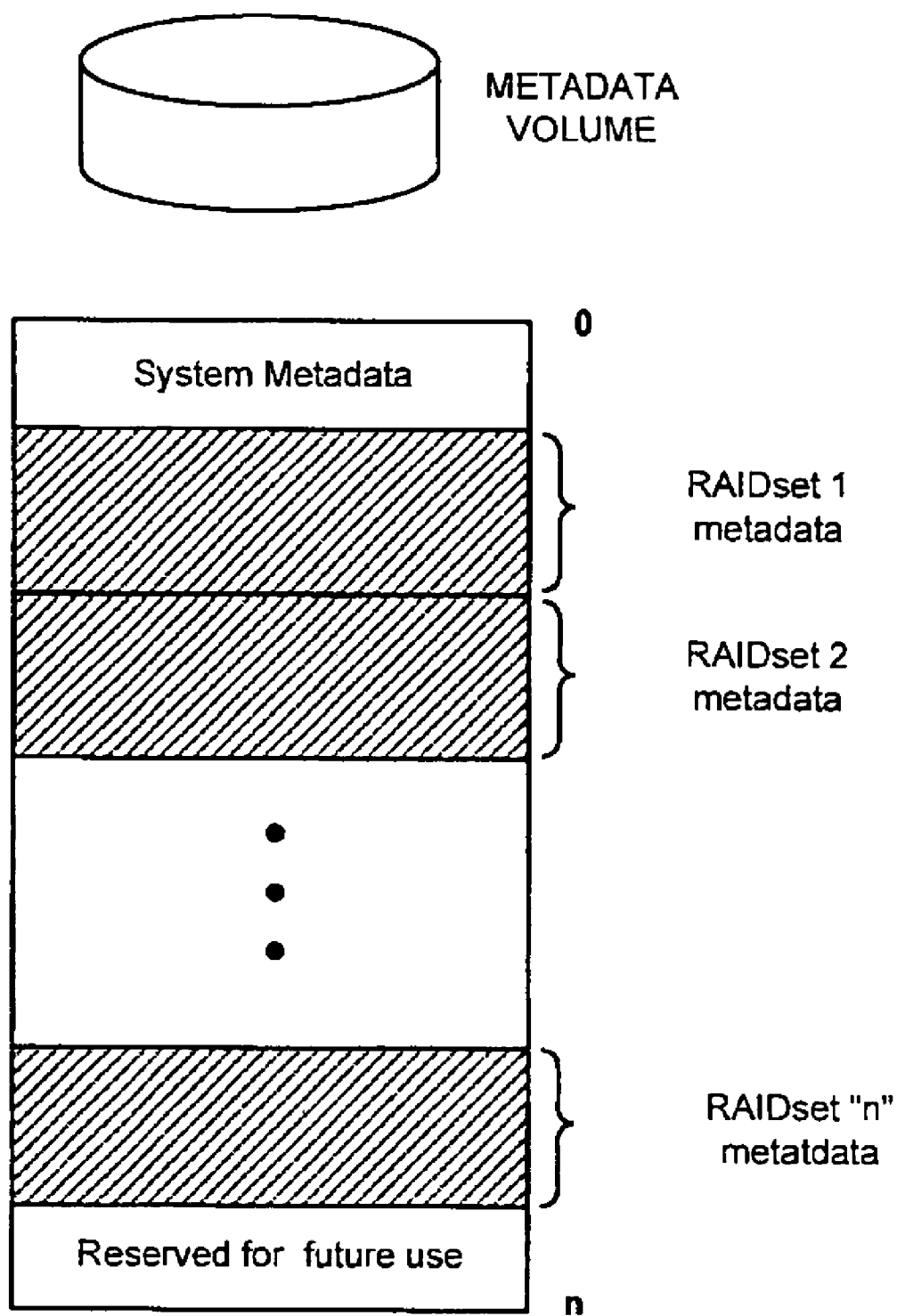
FIG. 6 is a diagram illustrating the content of a metadata disk in accordance with one embodiment.

In a preferred implementation, a metadata volume is located within each shelf corresponding to metadata for all data volumes resident on the disks in the shelf. Referring to FIGS. 6 and 7, the data content of a metadata volume is illustrated. This volume contains all the metadata for the shelf, RAID, disk and enclosure. There also exists metadata for the rack controller. This metadata is used to determine the correct system configuration between the rack controller and disk shelf.

In one embodiment, the metadata volume contains shelf attributes, such as the number of total drives, drive spares, unused data, RAID set attributes and memberships, such as the RAID set set, drive attributes, such as the serial number, hardware revisions, firmware revisions, and volume cache, including read cache and write cache.

Volume Configurations

In one embodiment, the metadata volume is a set of mirrored disk drives. The minimum number of the mirrored drives in this embodiment is 2. The number of disk drives in the metadata volume can be configured to match the level of protection requested by the user. The number of disks cannot exceed the number of disk controllers. In order to provide the highest level of fault tolerance within a disk shelf, the metadata volume is mirrored across each disk controller. This eliminates the possibility of a single disk controller disabling the Shelf Controller.

In order to provide the best performance of a metadata volume, dynamic re-configuration is enabled to determine the best disk controllers for which to have the disk drives operational. Also, in the event of a metadata volume disk failure, the first unallocated disk drive within a disk shelf will be used. Thus if there are no more unallocated disk drives, the first allocated spare disk drive will be used. If there are no more disk drives available, the shelf controller will remain in a stalled state until the metadata volume has been addressed.

Volume Layout

The layout of the metadata volume is designed to provide persistent data and state of the disk shelf. This data is used for shelf configuring, RAID set configuring, volume configuring, and disk configuring. This persistent metadata is updated and utilized during all phases of the disk shelf (Initialization, Normal, Reconstructing, Service, etc.).

The metadata volume data is used to communicate status and configuration data to the rack controller. For instance, the metadata may include "health information for each disk drive (i.e., information on how long the disk drive has been in service, how many times it has been powered on and off, and other factors that may affect its reliability). If the health information for a particular disk drive indicates that the drive should be replaced, the system may begin copying the data on the disk drive to another drive in case the first drive fails, or it may simply provide a notification that the drive should be replaced at the next normal service interval. The metadata volume data also has designated volume-cache area for each of the volumes. In the event that a volume is offline, the data stored in the metadata volume for the offline volume can be used while the volume comes online. This provides, via a request from the rack controller, a window of 10-12 seconds (or whatever time is necessary to power-on the corresponding drives) during which write data is cached while the drives of the offline volume are being powered up. After the drives are powered up and the volume is online, the cached data is written to the volume.

Shelf Initializations

At power-on/reset of the disk shelf, all data is read from the metadata volume. This data is used to bring the disk shelf to an operational mode. Once the disk shelf has completed the initialization, it will wait for the rack controller to initiate the rack controller initialization process.

Volume Operations

Once the disk shelf is in an operational mode, each volume is synchronized with the metadata volume. Each volume will have its associated set of metadata on the disk drive This is needed in the event of a disastrous metadata volume failure.

Read Cache Operations

The metadata volume has reserved space for each volume. Within the reserved space of the metadata volume resides an allocated volume read cache (VRC). This read cache is designed to alleviate the spin-up and seek time of a disk drive once initiated with power. The VRC replicates the initial portion of each volume. The size of data replicated in the VRC will depend on the performance desired and the environmental conditions. Therefore, in the event that an I/O READ request is given to an offline volume, the data can be sourced from the VRC. Care must be taken to ensure that this data is coherent and consistent with the associated volume.

Write Cache Operations

As noted above, the metadata volume has reserved space for each volume. Within the reserved space of the metadata volume resides an allocated volume write cache (VWC). This write cached is designed to alleviate the spin-up and seek time of a disk drive once initiated with power. The VWC has a portion of the initial data, e.g., 512 MB, replicated for each volume. Therefore, in the event that an I/O write request is given to an offline volume, the data can be temporarily stored in the VWC. Again, care must be taken to ensure that this data is coherent and consistent with the associated volume.

Set of Disk I/O Operations

Figure 8:
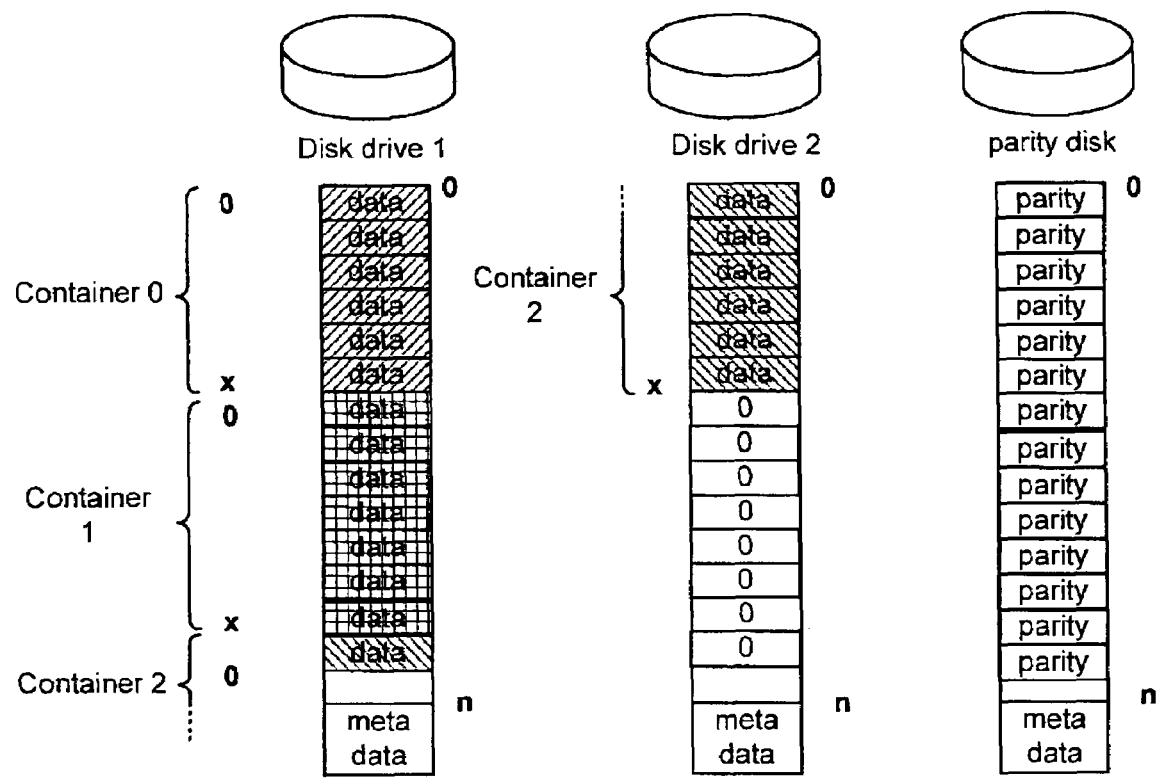
FIG. 8 is a diagram illustrating the manner in which containers of data are arranged on a set of disk drives in accordance with one embodiment.

Referring to FIG. 8, a diagram illustrating the manner in which data is stored on a set of disks is shown. A set of disks are partitioned into "large contiguous" sets of data blocks, known as containers. Single or multiple disk volumes, which are presented to the storage user or server, can, represent a container. The data blocks within a container are dictated by the disk sector size, typically, 512 bytes. Each container is statically allocated and addressed from 0 to x, where x is the number of data blocks minus 1. Each container can be then divided into some number of sub-containers.

The access to each of the containers is through a level of address indirection. The container is a contiguous set of blocks that is addressed from 0 to x. As the device is accessed, the associated disk drive must be powered and operational. As an example, container 0 is fully contained within the address space of disk drive 1. Thus, when container 0 is written or read, the only disk drive that is powered on is disk drive 1.

Figure 9:
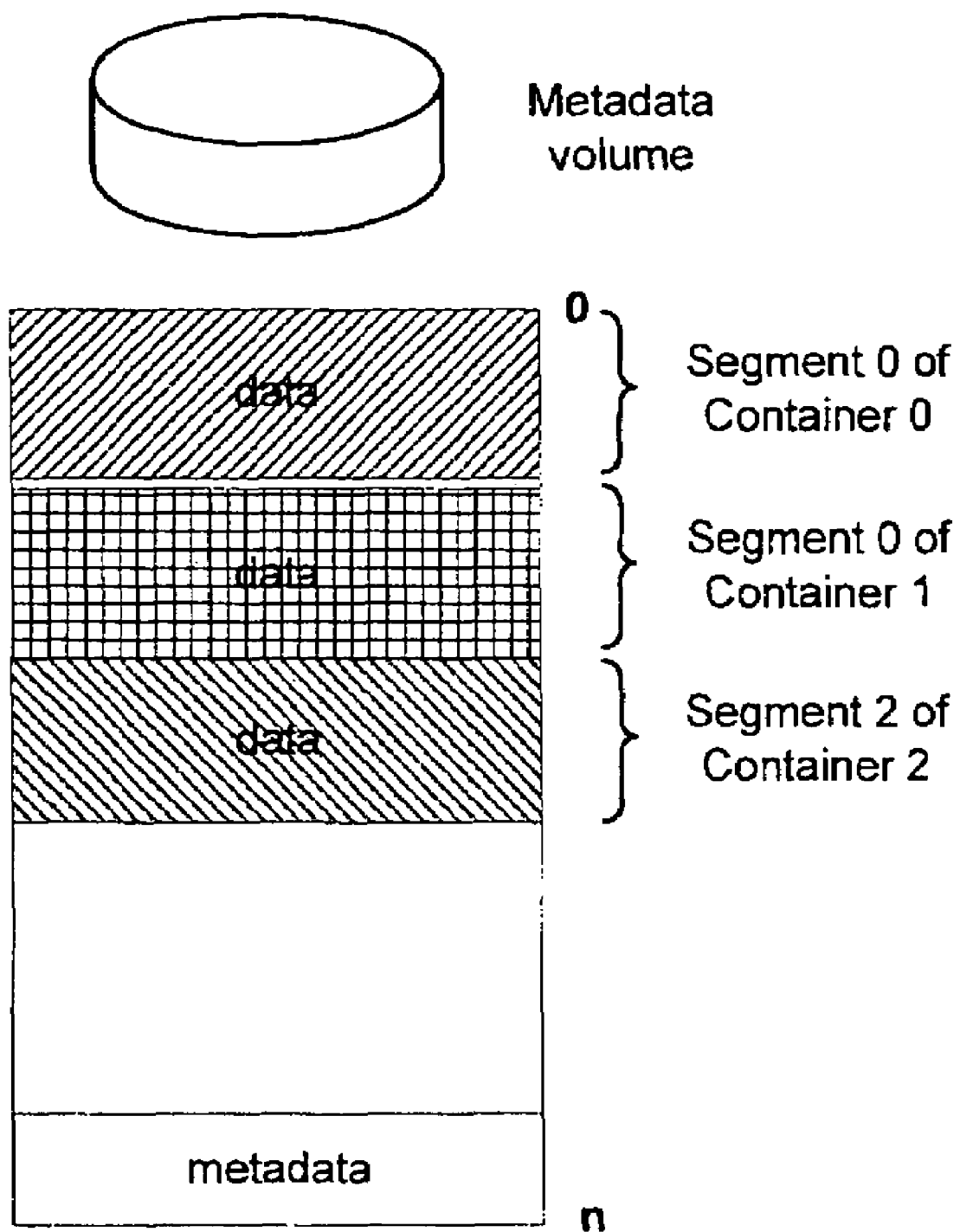
FIG. 9 is a diagram illustrating the manner in which the initial segments of data from a plurality of disk drives are stored on a metadata volume in accordance with one embodiment.

If there is a limited amount of power and cooling capacity for the system and only one disk drive can be accessed at a time, then in order to access container 2, disk drives 1 and 2 must be alternately powered, as container 2 spans both disk drives. Initially, disk drive 1 is powered. Then, disk drive 1 is powered down, and disk drive 2 is powered up. Consequently, there will be a delay for disk drive 2 to become ready for access. Thus, the access of the next set of data blocks on disk drive 2 will be delayed. This generally is not an acceptable behavior for access to a disk drive. The first segment of each disk drive and/or container is therefore cached on a separate set of active/online disk drives. In this embodiment, the data blocks for container 2 reside on the metadata volume, as illustrated in FIG. 9.

Figure 10:
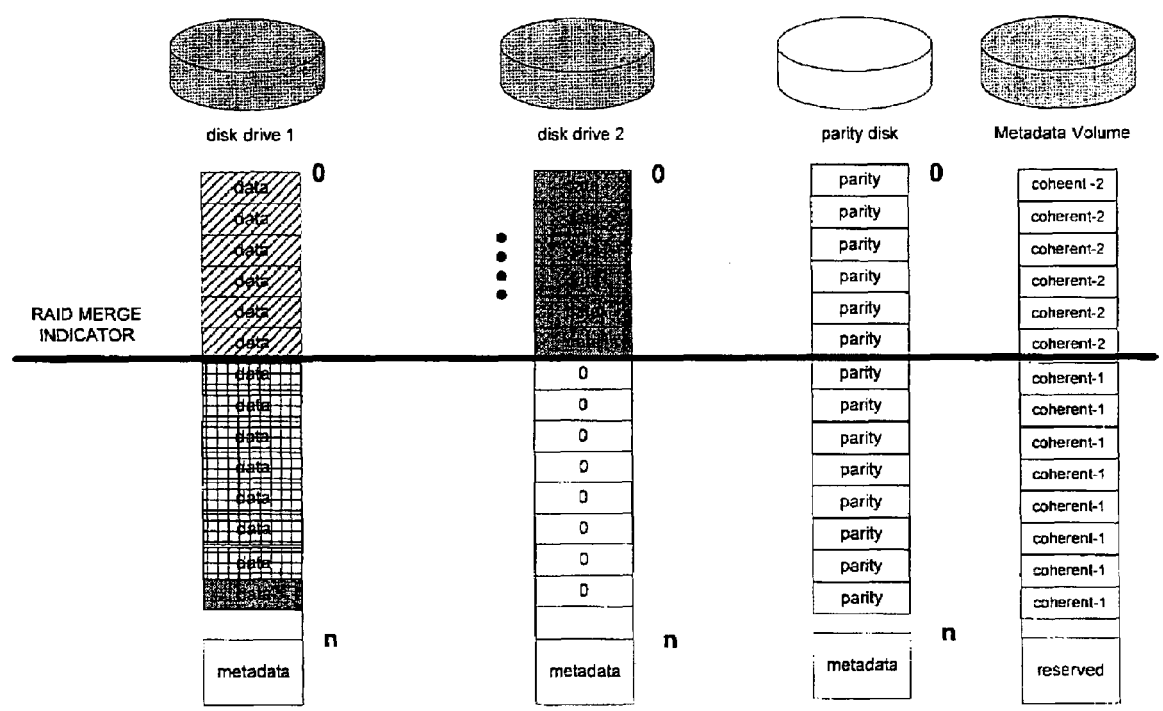
FIG. 10 is a diagram illustrating the use of a pair of redundant disk drives and corresponding parity and metadata volumes in accordance with one embodiment.

This technique, in which a transition between two disk drives is accomplished by powering down one disk drive and powering up the other disk drive, can be applied to more than just a single pair of disk drives. In the event that there is a need for higher bandwidth, the single drives described above can each be representative of a set of disk drives. This disk drive configuration could comprise RAID10 or some form of data organization that would "spread" a hot spot over many disk drives (spindles). Set of Disk Drives becoming Redundant Referring to FIG. 10, a diagram illustrating the use of a pair of redundant disk drives is shown. As data is allocated to a set of disk drives, there is a need for data replication. Assuming that the replication is a form of RAID (1, 4, 5, etc.), then the process of merging must keep the data coherent. This process may be done in synchronously with each write operation, or it may be performed at a later time. Since not all disk drives are powered on at one time, there is additional housekeeping of the current status of a set of disk drives. This housekeeping comprises the information needed to regenerate data blocks, knowing exactly which set of disk drives or subset of disk drives are valid in restoring the data.

Variable RAID Set Membership

One significant benefit of the power-managed system described herein is that drives in a RAID set can be reused, even in the event of multiple disk drive failures. In conventional RAID systems, failure of more than one drive in a RAID set results in the need to abandon all of the drives in the RAID set, since data is striped or distributed across all of the drives in the RAID set. In the case of the power-managed system described herein, it is possible to reuse the remaining drives in a different RAID set or a RAID set of different size. This results in much greater utilization of the storage space in the total system.

In the event of multiple drive failures in the same RAID set, the set of member drives in the RAID set can be decreased (e.g., from six drives to four). Using the property of "zero-based" XOR parity as described above, the parity for the reduced set of drives can be calculated from the data that resides on these drives. This allows the preservation of the data on the remaining drives in the event of future drive failures. In the event that the parity drive is one of the failed drives, a new parity drive could be designated for the newly formed RAID set, and the parity information would be stored on this drive. Disk drive metadata is updated to reflect the remaining and/or new drives that now constitute the reduced or newly formed RAID set.

In one exemplary embodiment, a RAID set has five member drives, including four data drives and one parity drive. In the event of a failure of one data drive, the data can be reconstructed, either on the remaining disk drives if sufficient space is available. (If a spare is available to replace the failed drive and it is not necessary to reduce the RAID set, the data can be reconstructed on the new member drive.) In the event of a simultaneous failure of two or more data drives, the data on the non-failed drives can be retained and operations can proceed with the remaining data on the reduced RAID set, or the reduced RAID set can be re-initialized and used as a new RAID set.

This same principle can be applied to expand a set of disk drives. In other words, if it would be desirable to add a drive to a RAID set (e.g., increasing the set from four drives to five), this can also be accomplished in a manner similar to the reduction of the RAID set. In the event a RAID set would warrant an additional disk drive, the disk drive metadata would need to be updated to represent the membership of the new drive(s).

Sparing of a Set of Disk Drives

The sparing of a failed disk on of a set of disk drives is performed at both failed data block and the failed disk drive events. The sparing of failed data blocks is temporarily regenerated. Using both the metadata volume and a 'spare' disk drive, the process of restoring redundancy within a set of disk drives, can be more efficient and effective. This process is matched to the powering of the each of the remaining disk drives in a set of disk drives.

In the event of an exceeded threshold for failed data blocks, a spare disk drive is allocated as a candidate for replacement into the RAID set. Since only a limited number of drives can be powered on at one time, only the drive having the failed data blocks and the candidate drive are powered. At this point, only the known good data blocks are copied onto the corresponding address locations of the failed data blocks. Once all the known good blocks have been copied, the process to restore the failed blocks is initiated. Thus the entire RAID set will need to be powered on. Although the entire set of disk drives needs to powered on, it is only for the time necessary to repair the bad blocks. After all the bad blocks have been repaired, the drives are returned to a powered-off state.

In the event of a failed disk drive, all disk drives in the RAID set are powered on. The reconstruction process, discussed in the previous section, would then be initiated for the restoration of all the data on the failed disk drive.

RAID Automated Storage Management Features

Figure 11:
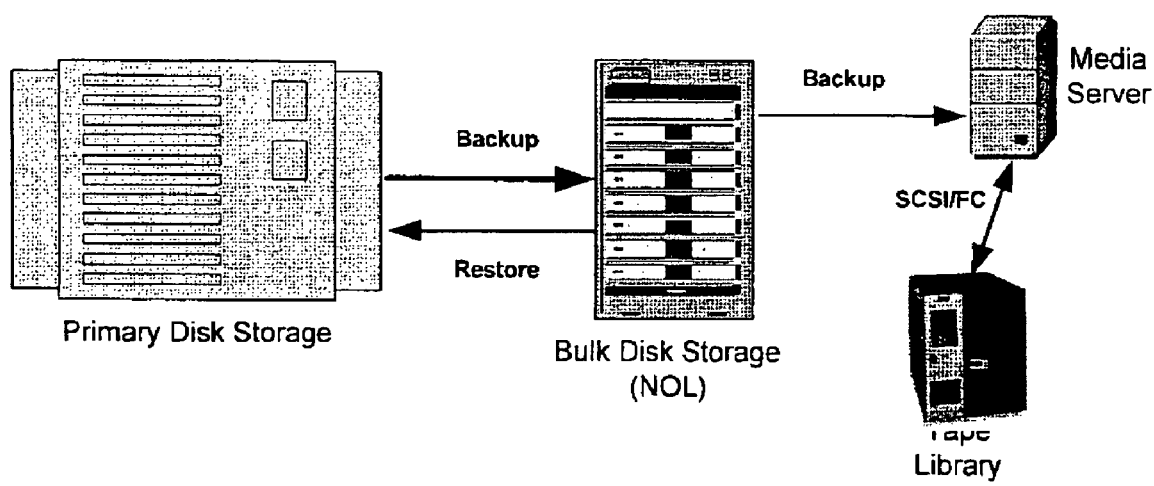
FIG. 11 is a diagram illustrating the use of a data storage system as a backup target for the primary storage via a direct connection and as a media (backup) server to a tape library in accordance with one embodiment.

The end user of the system may use it, for example, as a disk system attached directly to a server as direct attached storage (DAS) or as shared storage in a storage area network (SAN). In FIG. 11, the system is used as the backup target to the primary storage via a direct connection and then connected via a media (backup) server to a tape library. The system may be used in other ways in other embodiments.

In this embodiment, the system presents volume images to the servers or users of the system. However, physical volumes are not directly accessible to the end users. This is because, as described earlier, through the power managed RAID, the system hides the complexity of access to physical drives, whether they are powered on or not. The controller at the rack and the shelf level isolates the logical volume from the physical volume and drives.

Given this presentation of the logical view of the disk volumes, the system can rewrite, relocate or move the logical volumes to different physical locations. This enables a number of volume-level functions that are described below. For instance, the system may provide independence from the disk drive type, capacity, data rates, etc. This allows migration to new media as they become available and when new technology is adopted. It also eliminates the device (disk) management administration required to incorporate technology obsolescence.

The system may also provide automated replication for disaster recovery. The second copy of a primary volume can be independently copied to third party storage devices over the network, either local or over wide-area. Further, the device can be another disk system, another tape system, or the like. Also, the volume could be replicated to multiple sites for simultaneously creating multiple remote or local copies.

The system may also provide automatic incremental backup to conserve media and bandwidth. Incremental and differential changes in the storage volume can be propagated to the third or later copies.

The system may also provide authentication and authorization services. Access to both the physical and logical volumes and drives can be controlled by the rack and shelf controller since it is interposed between the end user of the volumes and the physical drives.

The system may also provide automated data revitalization. Since data on disk media can degrade over time, the system controller can refresh the volume data to different drives automatically so that the data integrity is maintained. Since the controllers have information on when disks and volumes are written, they can keep track of which disk data has to be refreshed or revitalized.

The system may also provide concurrent restores: multiple restores can be conducted concurrently, possibly initiated asynchronously or via policy by the controllers in the system.

The system may also provide unique indexing of metadata within a storage volume: by keeping metadata information on the details of objects contained within a volume, such as within the metadata volume in a shelf. The metadata can be used by the controller for the rapid search of specific objects across volumes in the system.

The system may also provide other storage administration feature for the management of secondary and multiple copies of volumes, such as single-view of all data to simplify and reduce cost of managing all volume copies, automated management of the distribution of the copies of data, and auto-discovery and change detection of the primary volume that is being backed up When the system is used for creating backups.

A Preferred Implementation

Interconnect

Figure 12:
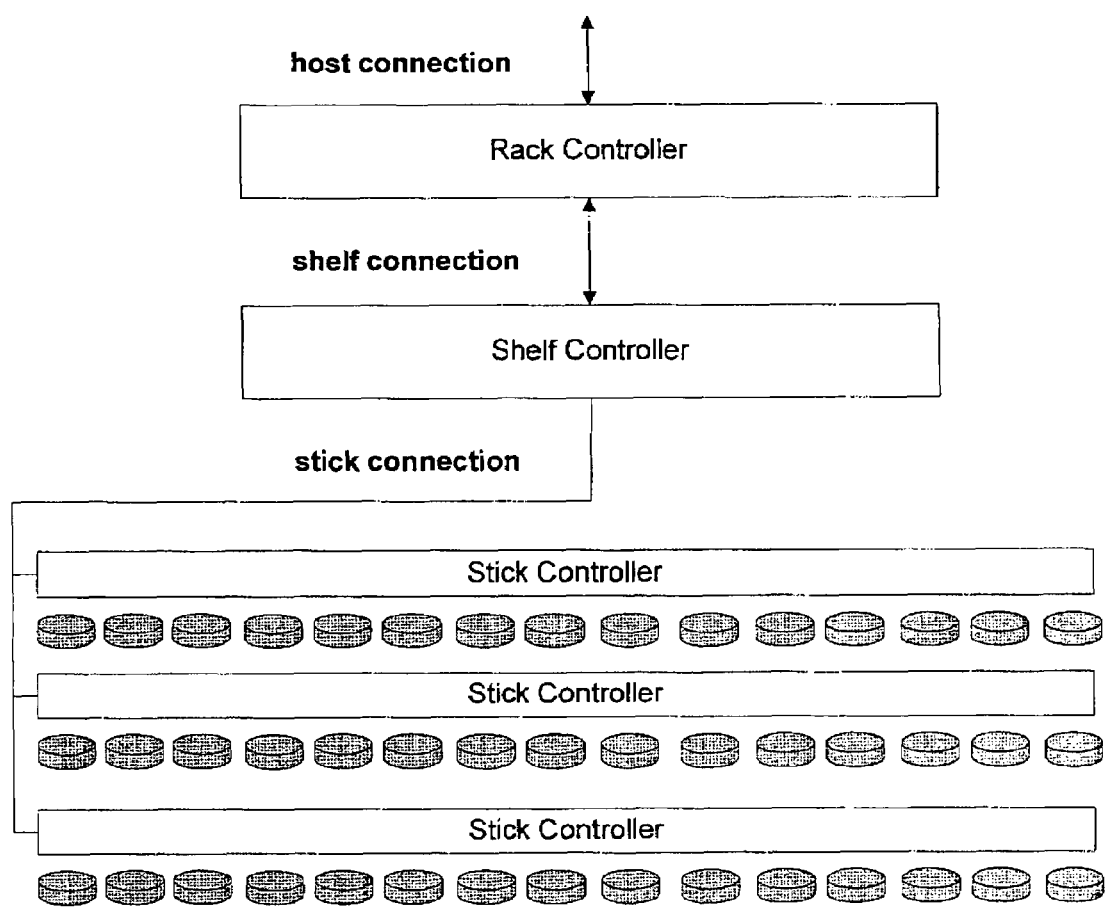
FIG. 12 is a diagram illustrating the interconnect from the host (server or end user) to the end disk drives in accordance with one embodiment.

The preferred interconnect system provides a means to connect 896 disk drives, configured as 112 disks per shelf and 8 shelves per rack. The internal system interconnect is designed to provide an aggregate throughput equivalent to six 2 Gb/sec Fibre Channel interfaces (1000 MB/s read or write). The external system interface is Fibre Channel. The interconnect system is optimized for the lowest cost per disk at the required throughput. FIG. 12 shows the interconnect scheme from the host (server or end user) to the end disk drives.

The interconnect system incorporates RAID at the shelf level to provide data reliability. The RAID controller is designed to address 112 disks, some of which may be allocated to sparing. The RAID controller spans 8 sticks of 14 disks each. The RAID set should be configured to span multiple sticks to guard against loss of any single stick controller or interconnect or loss of any single disk drive.

The system interconnect from shelf to stick can be configured to provide redundancy at the stick level for improved availability.

The stick-level interconnect is composed of a stick controller (FPGA/ASIC plus SERDES), shelf controller (FPGA/ASIC plus SERDES, external processor and memory), rack controller (FPGA/ASIC plus SERDES) and associated cables, connectors, printed circuit boards, power supplies and miscellaneous components. As an option, the SERDES and/or processor functions may be integrated into an advanced FPGA (e.g., using Xilinx Virtex II Pro).

Shelf and Stick Controller

Figure 13:
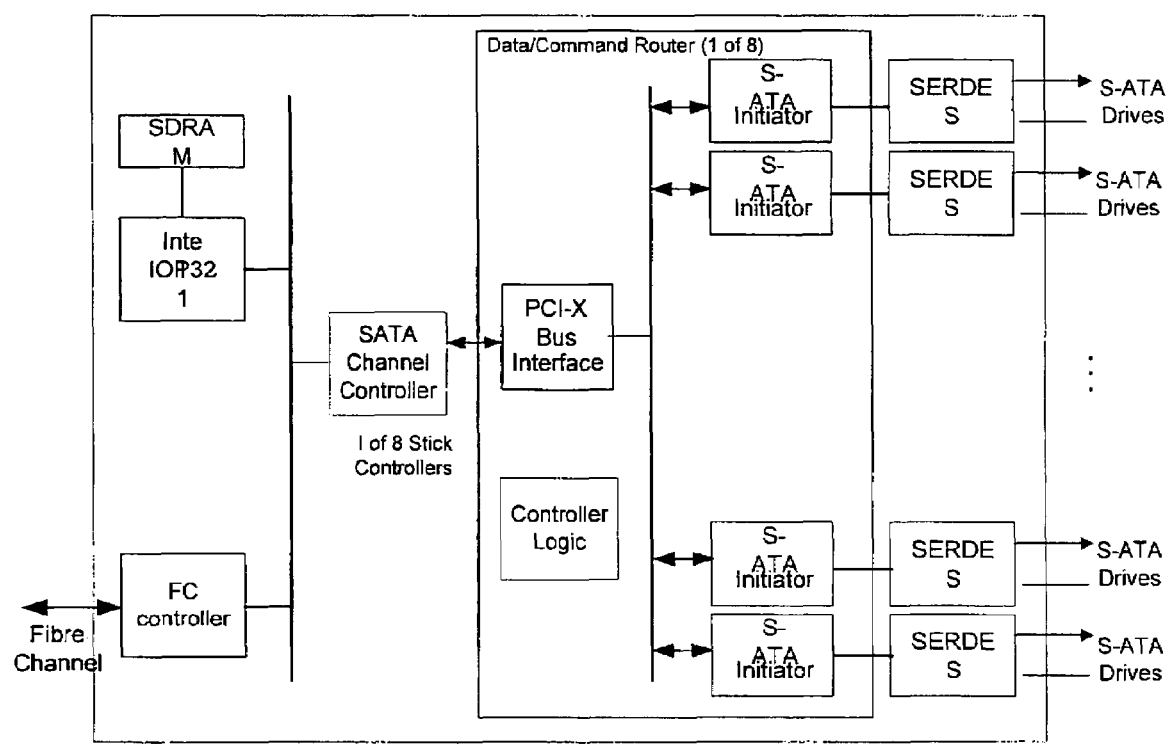
FIG. 13 is a diagram illustrating the interconnection of a channel controller with multiple stick controllers in accordance with one embodiment.
Figure 15:
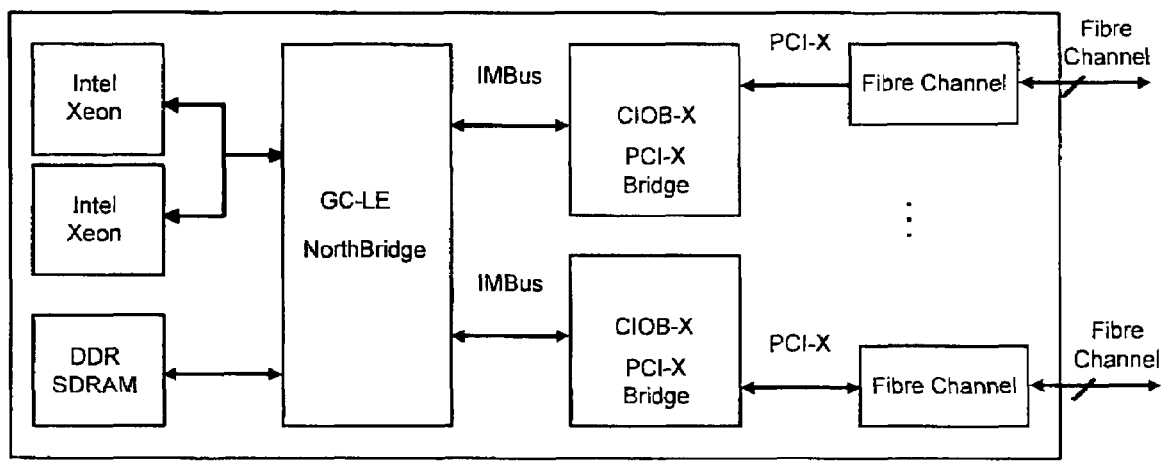
FIG. 15 is a diagram illustrating the implementation of a rack controller in accordance with one embodiment.

The shelf controller and the associated 8 stick controllers are shown in FIG. 13. In this implementation, the shelf controller is connected to the rack controller (FIG. 15) via Fibre Channel interconnects. It should be noted that, in other embodiments, other types of controllers and interconnects (e.g., SCSI) may be used.

The shelf controller can provide different RAID level support such as RAID 0, 1 and 5 and combinations thereof across programmable disk RAID sets accessible via eight SATA initiator ports. The RAID functions are implemented in firmware, with acceleration provided by an XOR engine and DMA engine implemented in hardware. In this case, XOR-equipped CPU Intel IOP321 is used.

Figure 14:
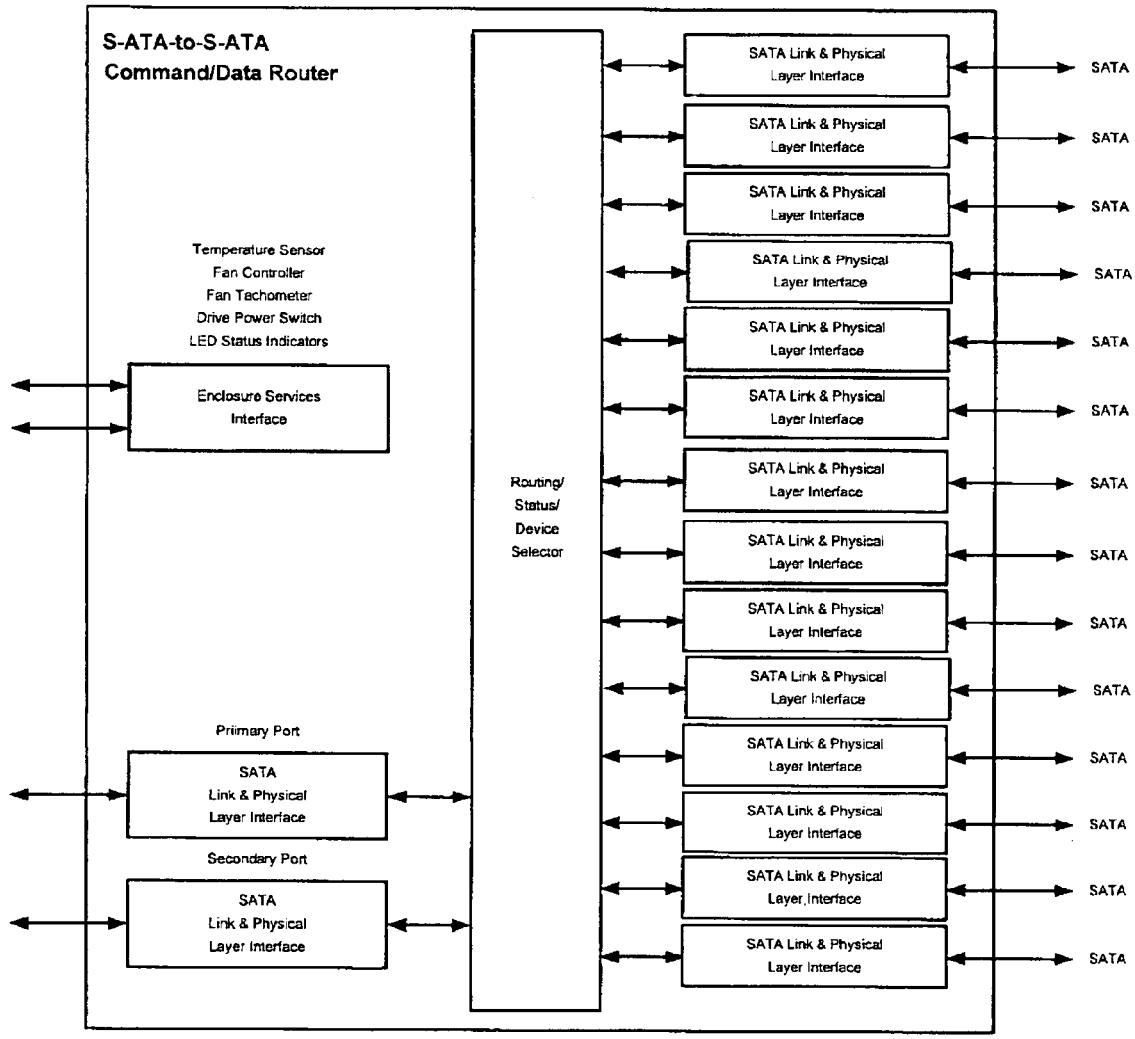
FIG. 14 is a diagram illustrating the interconnection of the outputs of a SATA channel controller with corresponding stick controller data/command router devices in accordance with one embodiment.

The Shelf Controller RAID control unit connects to the Stick Controller via a SATA Channel Controller over the PCI-X bus. The 8 SATA outputs of the SATA Channel Controller each connect with a stick controller data/command router device (FIG. 14). Each data/command router controls 14 SATA drives of each stick.

Rack Controller

The rack controller comprises a motherboard with a ServerWorks GC-LE chipset and four to 8 PCI-X slots. In the implementation shown in FIG. 15, the PCI-X slots are populated with dual-port or quad-port 2 G Fibre Channel PCI-X target bus adapters (TBA). In other embodiments, other components, which employ other protocols, may be used. For example, in one embodiment, quad-port shelf SCSI adapters using u320 to the shelf units may be used.

Background Processing of Data-Enhancing Operations

The present invention further provides methods and systems for performing background processing of data-enhancing operations on the storage devices. Background processing can use idle resources, such as energy resources, processing resources, and bandwidth resources. Background processing includes performing data-enhancing operations such as data compression, data-integrity check, data reliability test, object index preparation, and content search. Data enhancing operations can include any type of operation that serves to increase the speed, efficiency or reliability of the storage system, or provides other desirable benefits to data retrieval, storage, checking, transfer or processing. Some data-enhancing operations include system storage operations that relate to data on multiple disks or storage devices. Such storage operations can include RAID operations such as parity, data protection or error-correction computations and checking.

In a preferred embodiment, data-enhancing operations are performed as background tasks, so that the real-time tasks, which need to be performed instantly, should not suffer. With background processing of the data-enhancing operations, a number of new benefits may be realized and data reliability may be improved. While processing each of the data-enhancing operations, the disks are powered on, and a processing task is initiated to operate on data read from the storage disks.

Figure 16:
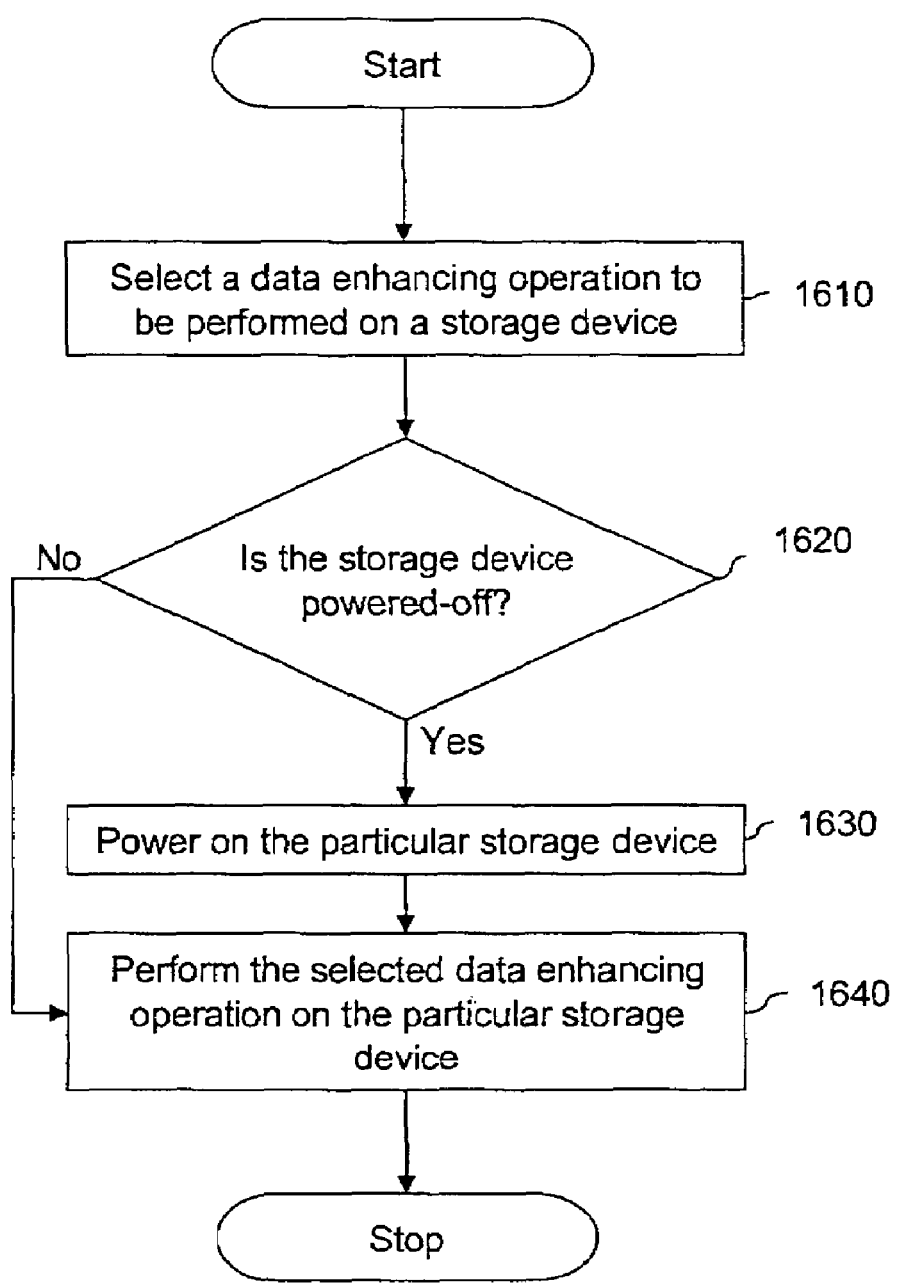
FIG. 16 is a flow diagram illustrating an overview of the method for processing data in accordance with one embodiment.

Referring to FIG. 16, a flow diagram illustrating a method for background processing data is shown, in accordance with an embodiment of the present invention. At step 1610, a data-enhancing operation that is to be performed on a storage device is selected. In an embodiment of the present invention, the data-enhancing operation is selected based on a rule defined by a user. For example, the user may define a rule according to which data-enhancing operations from a list are performed in a round-robin scheme. The data-enhancing operations can also be selected randomly, or based on a priority scheme defined by the user. At step 1620, a check is performed to ascertain whether the storage device selected to perform the data-enhancing operation, is powered-off. At step 1630, the selected storage device is powered on for utilizing the processing resources. In one embodiment of the invention, the powering-on requires checking of a power budget. The power budget defines the maximum number of disk drives that can be powered on a time. The power budget is determined using a priority level for each storage device and predicting future power consumption by adding a current total power consumption of the plurality of storage devices to the anticipated power consumption of the selected storage device. In one embodiment, if the power budget is not available, the background processing of the data-enhancing operations is not performed. At step 1640, the selected data-enhancing operation is performed on the storage device. Each of FIGS. 17 to 19 illustrate various methods of background processing of data-enhancing operations.

Figure 17:
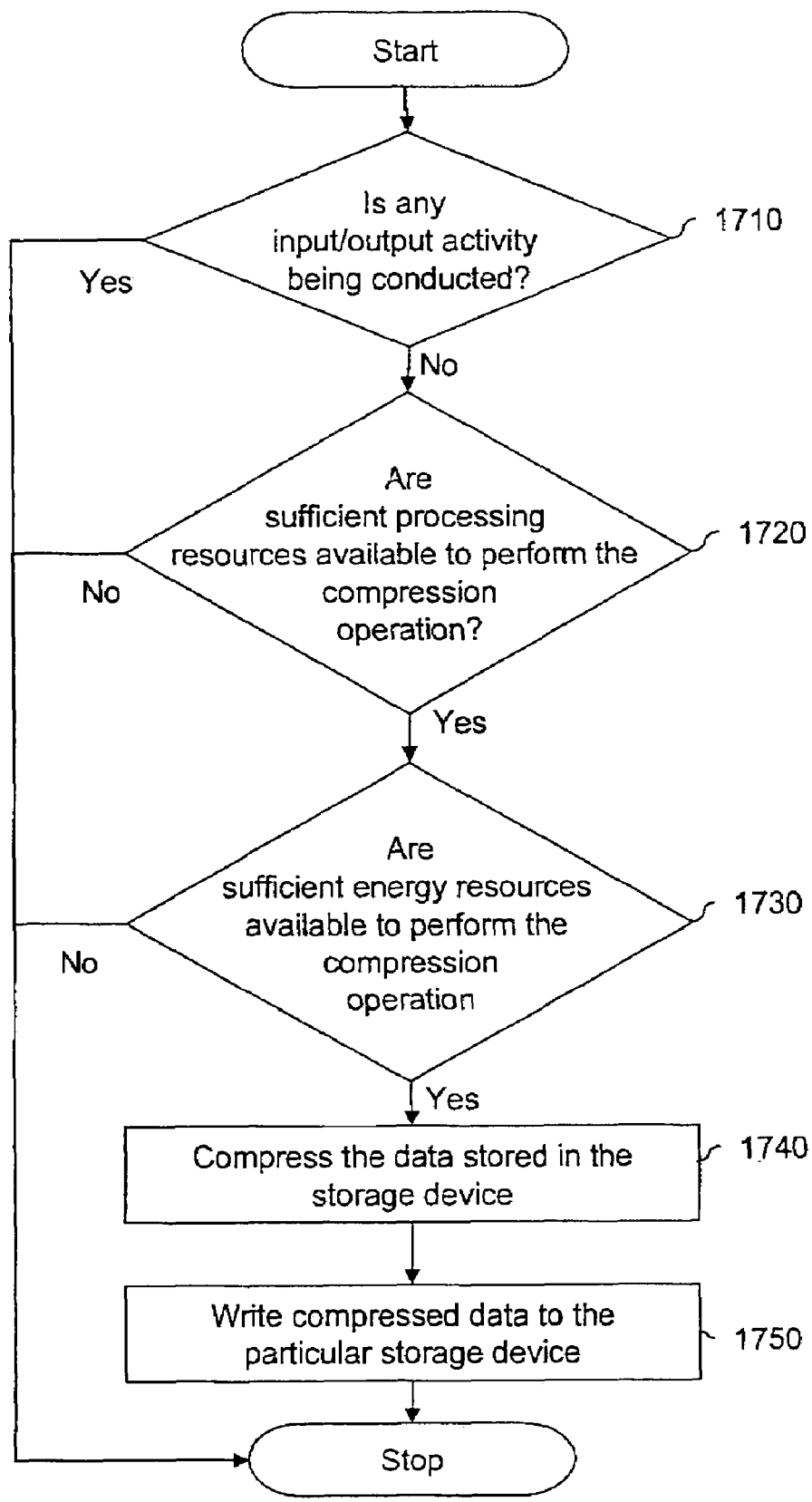
FIGS. 17 is a flow diagram illustrating an overview of the method for performing a lossless compression on the data in accordance with one embodiment.

Referring to FIG. 17, a flow diagram illustrating a method for performing data compression is shown, in accordance with an embodiment of the present invention. At step 1710, a check is performed to ascertain if any input/output activity is in progress at the selected device. In an embodiment of the present invention, in case an input/output activity is in progress, the input/output activity is delayed. The input/output activity can also be re-routed to another storage device or stopped. In another embodiment, the data compression is not performed in case an input/output activity is in progress. In case there is no input/output activity in progress, a check is performed to determine if sufficient processing resources are available for processing a compression operation, as shown at step 1720. Examples of processing resources include processing cycles, RAM, memory, and transmission bandwidth, etc. In case sufficient processing resources are available, then at step 1730, a check is performed to determine if sufficient energy resources are available. Examples of the energy resources include, power required etc. In other words, the power budget is checked to ensure that sufficient power is available to perform the compression operation. In case sufficient energy resources are available, then at step 1740, the data stored on the storage device is read and compressed. Any known compression technique may be used for compressing the selected data. Examples of known compression techniques include, loss-less compression, and global compression. Examples for loss-less compression include the ZIP compression scheme and the RAR compression scheme. In global compression, hash values for data are computed for all data that is stored in the data storage system. A reference to the stored data is also stored. When new data is to be written, a hash value for the data is computed, and in case the hash value is common, a reference to the previously stored data is stored instead of the complete data. Therefore, storage of multiple copies of the same data is avoided. Further details regarding global compression can be obtained from a paper titled 'Venti: A New Approach to Archival Storage', by Quinlan et al, in the First USENIX conference on File and Storage Technologies, in 2002. At step 1750, the compressed data is written on the storage device. This data-enhancing operation of compression improves utilization of storage capacity of the storage device. The background processing of data compression, as has been described above, is triggered only on the conditions that no input/output activity is currently being pursued, and sufficient energy and processing resources are available.

Figure 18:
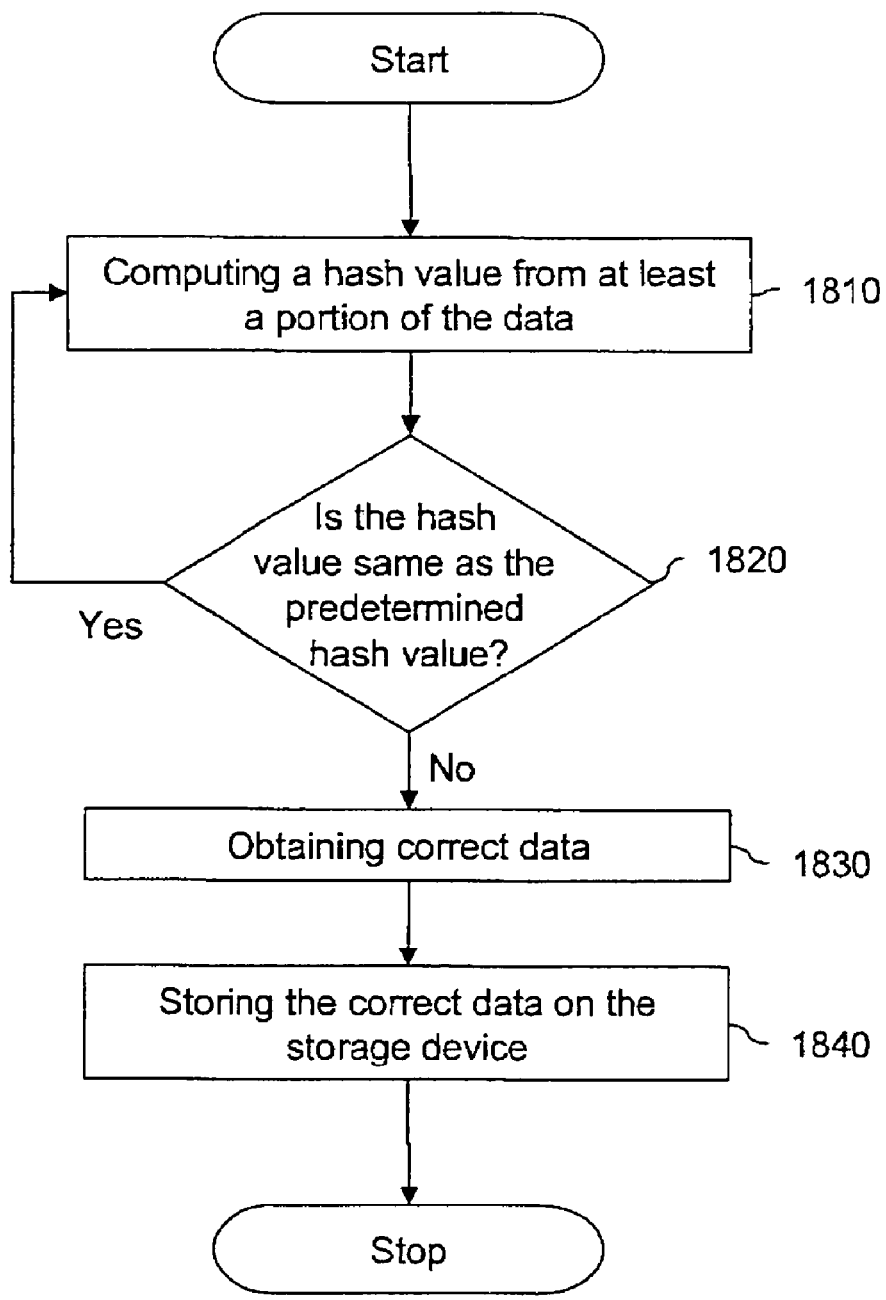
FIG. 18 is a flow diagram illustrating an overview of the method for performing an integrity-check operation on the data in accordance with one embodiment.
Figure 19:
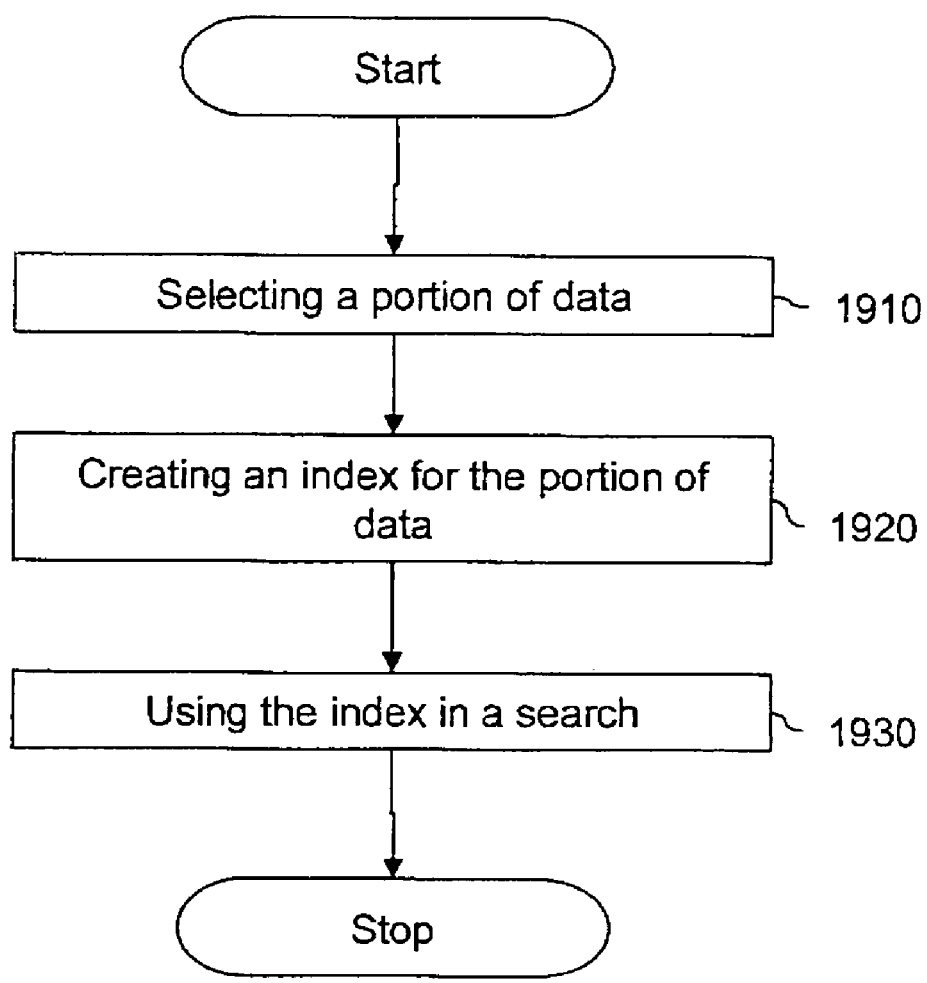
FIG. 19 is a flow diagram illustrating an overview of the method for performing a data search in accordance with one embodiment.

Referring to FIG. 18, a flow diagram illustrating a method for performing an integrity-check operation on data is shown, in accordance with an embodiment of the present invention. An integrity-check operation is a storage operation that involves RAID calculations. Examples of integrity-check operations include hash value comparison and parity or checkbit determination. At step 1810, a portion of the data is selected and a hash value, which represents that portion of the data, is computed. In an embodiment of the invention, all data written, for example as fixed size segments or files, have hash values computed at the time of storage. At step 1820, the hash value is checked against a pre-determined hash value, which is computed at the time of storage of the same portion of the data. In case the computed hash value is not equal to the pre-determined hash value, it is concluded that the selected portion of the data is corrupted. At step 1830, a correct copy of the corrupted data is obtained. In case the original data is cached, the cached data is rewritten to the selected storage device. However, in case the original copy of the portion of the data is not available, a request to obtain a corrected copy or a backup copy is initiated. The copy obtained, as a result of the request, is replicated in place of the corrupted data portion, at step 1840. For example, the corrupted data can be recreated with the help of other storage devices in the row of the storage device, and a parity drive. In accordance with an embodiment of the present invention, integrity check is performed at the system controller level.

In an embodiment of the present invention, an integrity-check operation may be performed at the storage shelf level. The storage shelf level integrity-check operation includes generation of additional parity or checkbits, for example using Galois fields, on a RAID set. For example, to calculate parity for data using Galois fields, the data is grouped into symbols of a fixed length. Further, each group is represented by a polynomial. A combination of addition and multiplication operations are then performed on the polynomials to compute the parity. In another embodiment of the invention, the storage level integrity-check operation may include generation of two-dimensional parity scheme using spare disks to write the parity. A two-dimensional parity scheme generates parity by performing exclusive-or (XOR) operations on data stored in storage devices arranged in a row or a shelf. The selection of storage devices can be linear (through a row) or diagonal. An EvenOdd parity generation scheme for calculating parity can also be used.

Referring to FIG. 19, a flow diagram illustrating a method for performing a data search is shown, in accordance with an embodiment of the present invention. A portion of data is selected at step 1910. In an embodiment of the present invention, the portion of data comprises text in a known language. At step 1920, an index is created for the portion of data. The index is created using any known indexing techniques. Examples of known indexing techniques include keyword indexing and content indexing. Indexing techniques require attributes for indexing data. Examples for attributes include the author of text included in the portion of data, and the date on which the portion of data was created. In accordance with an embodiment of the present invention, attributes for indexing can be defined either by a user or by an application. Examples of user-defined attributes include keywords, context and examples defined by a user. Application-defined attributes include source Internet Protocol (IP) address of data, size of a data file, etc.

At step 1930, a data-search is carried out using the index generated at step 1920. In an alternate embodiment of the present invention, the search is carried out independent of the indexing. Parallel indexing operations may also be performed across multiple storage shelves in case sufficient power resources and processing resources are available. Parallel indexing operations result in more efficient searches. In accordance with an embodiment of the present invention, indexing operation is performed at the system controller level. The indexes, as generated for such data sets, may be used for background searches. In accordance with one embodiment, searches are performed based on keywords, phrases, or using images. Parallel searches may also be performed depending on the availability of sufficient energy and processing resources.

Figure 20:
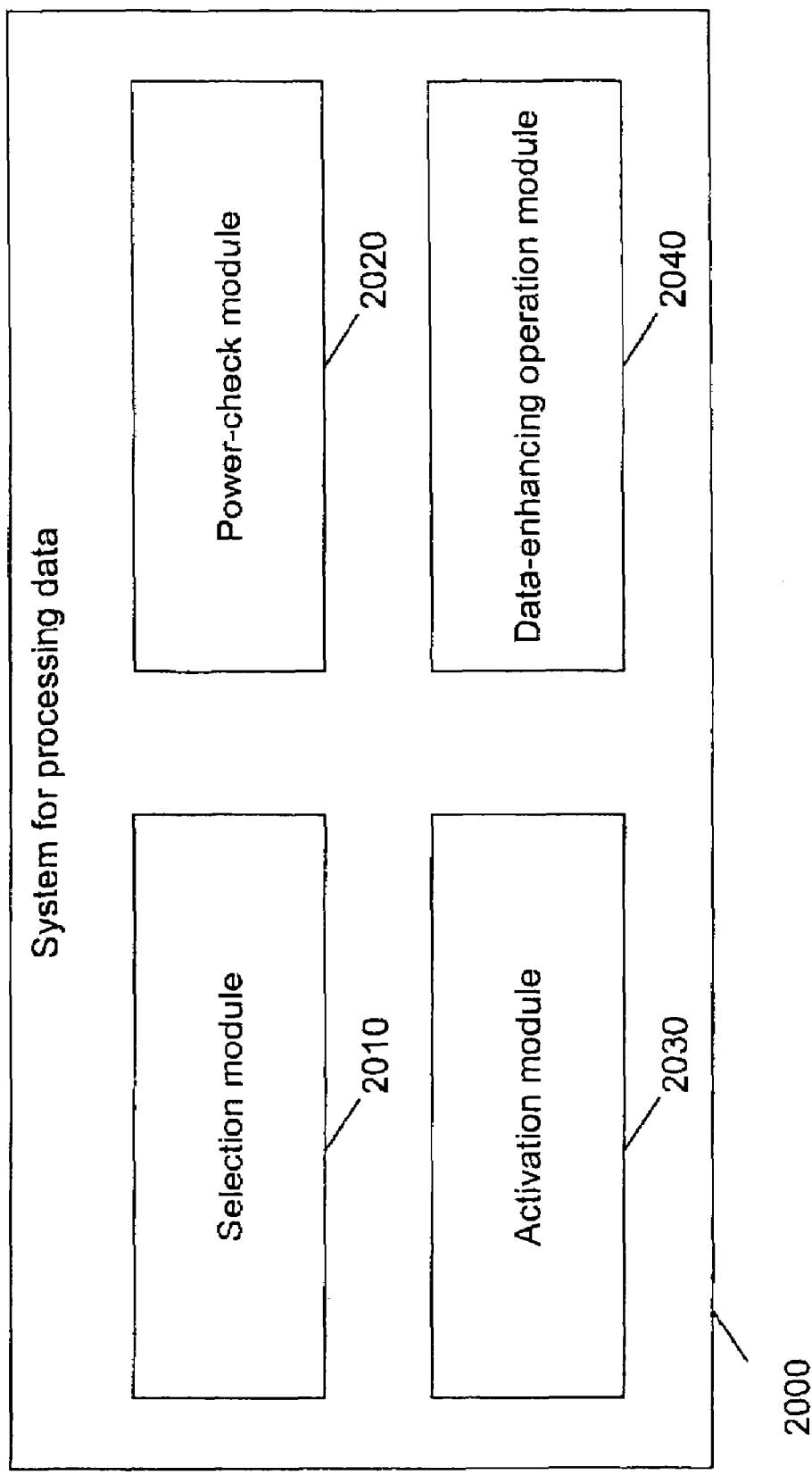
FIG. 20 is a diagram illustrating a system for processing data in accordance with one embodiment.

Referring to FIG. 20, a block diagram illustrating a system 2000 for processing data is shown, in accordance with an embodiment of the present invention. System 2000 for processing data includes a selection module 2010, a power-check module 2020, a power module 2030, and a data-enhancing operation module 2040. Selection module 2010 selects a data-enhancing operation from a given set of such operations. In accordance with an embodiment of the present invention, the set of operations include operations such as loss-less compression, data-integrity check, data reliability test, object index preparation, and content search. Power-check module 2020 checks if a selected data storage device is powered off. Activation module 2030 switches powers on the selected storage device. Data-enhancing module 2040 processes the selected data-enhancing operation in the background.

Figure 21:
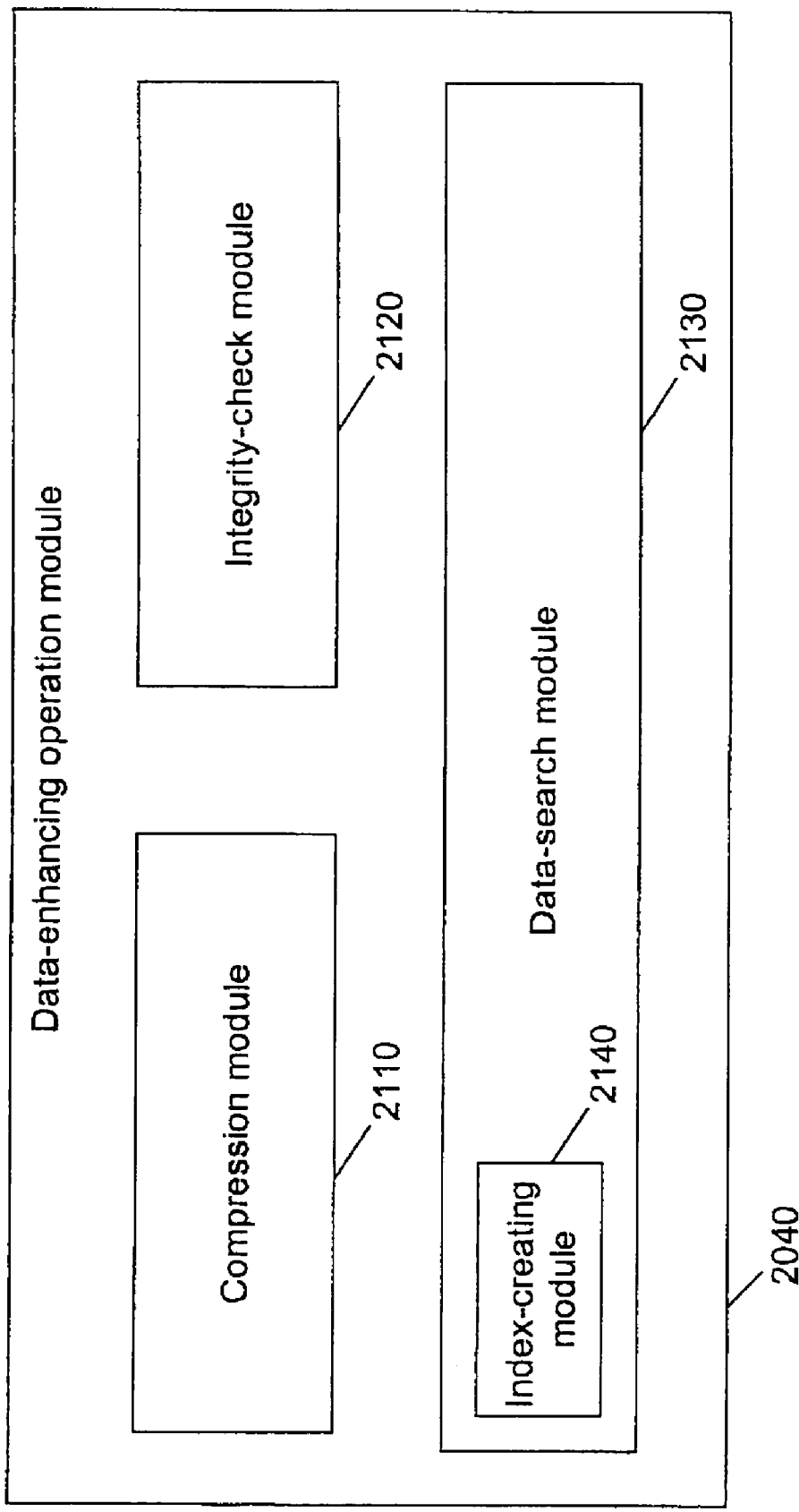
FIG. 21 is a diagram illustrating a data-enhancing operation module in accordance with one embodiment.

Referring to FIG. 21, a block diagram illustrating a data-enhancing operation module 2040 is shown, in accordance with an embodiment of the present invention. Data-enhancing operation module 2040 performs data-enhancing and storage operations on data stored in storage devices. Data-enhancing operation module 2040 includes a compression module 2110, an integrity-check module 2120, and a data-search module 2130. Compression module 2110 compresses data of a selected storage device, in accordance with an embodiment. Compression module 2110 is activated in case compression operation is selected as a data-enhancing operation. The compression of data in the background results in improved utilization of the data storage space of the storage devices. Compression module 2110 is described in detail in conjunction with FIG. 22. Integrity-check module 2120 checks the validity of the data as stored in the storage device, in accordance with one embodiment. Integrity-check module 2120 is activated in case integrity-check operation is selected for data enhancement. The processing of integrity-check in the background results in the improved reliability of data as stored in the data storage devices, as described in conjunction with FIG. 23.

Data-search module 2130 is responsible for searching for data. Data-search module 2130 is activated in case data-search is selected for processing in the background. In accordance with en embodiment of the present invention, data-search module 2130 includes an index-creating module

2140. Index-creating module 2140 creates an index of words related to a selected portion of the stored data. Index-creating module 2140 is activated in case index-creating operation is selected for data enhancement. The generated index may be used for efficient searching of data in the data storage devices as comparatively fewer resources are required for searching the data using generated indexes.

Figure 22:
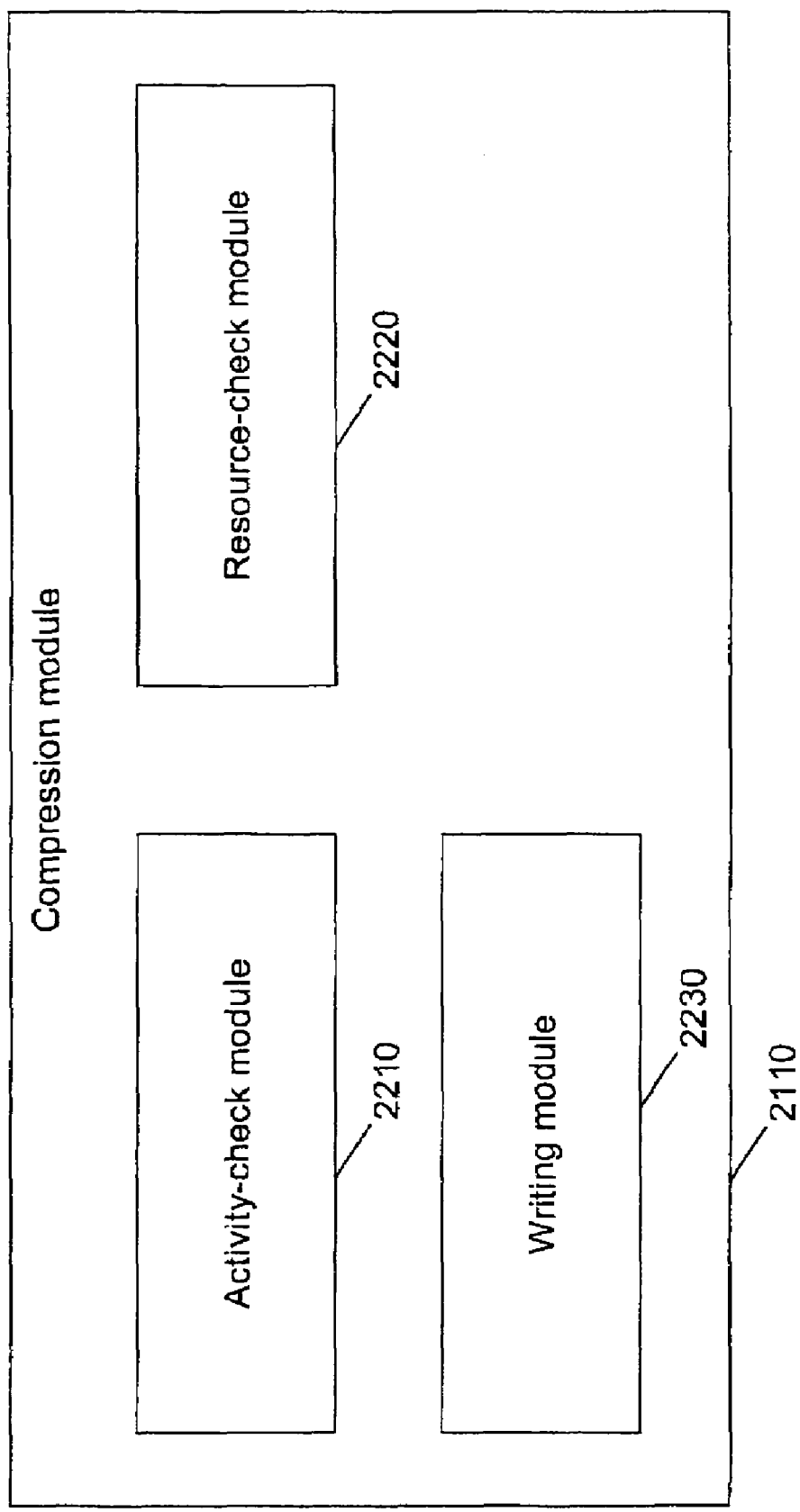
FIG. 22 is a diagram illustrating a compression module in accordance with one embodiment.

Referring to FIG. 22, a diagram illustrating a compression module is shown, in accordance with an embodiment of the present invention. Compression module 2110 includes an activity-check module 2210, a resource-check module 2220, and a writing module 2230. Activity-check module determines if any input/output activities are currently running on a selected storage device. Compression operation is performed only if no input/output activities currently running on the selected storage device. Resource check module 2220 identifies if required resources are available for performing compression operation on the selected storage device. The resources include energy resources and processing resources. Writing module 2230 writes the compressed data onto the selected storage device.

Figure 23:
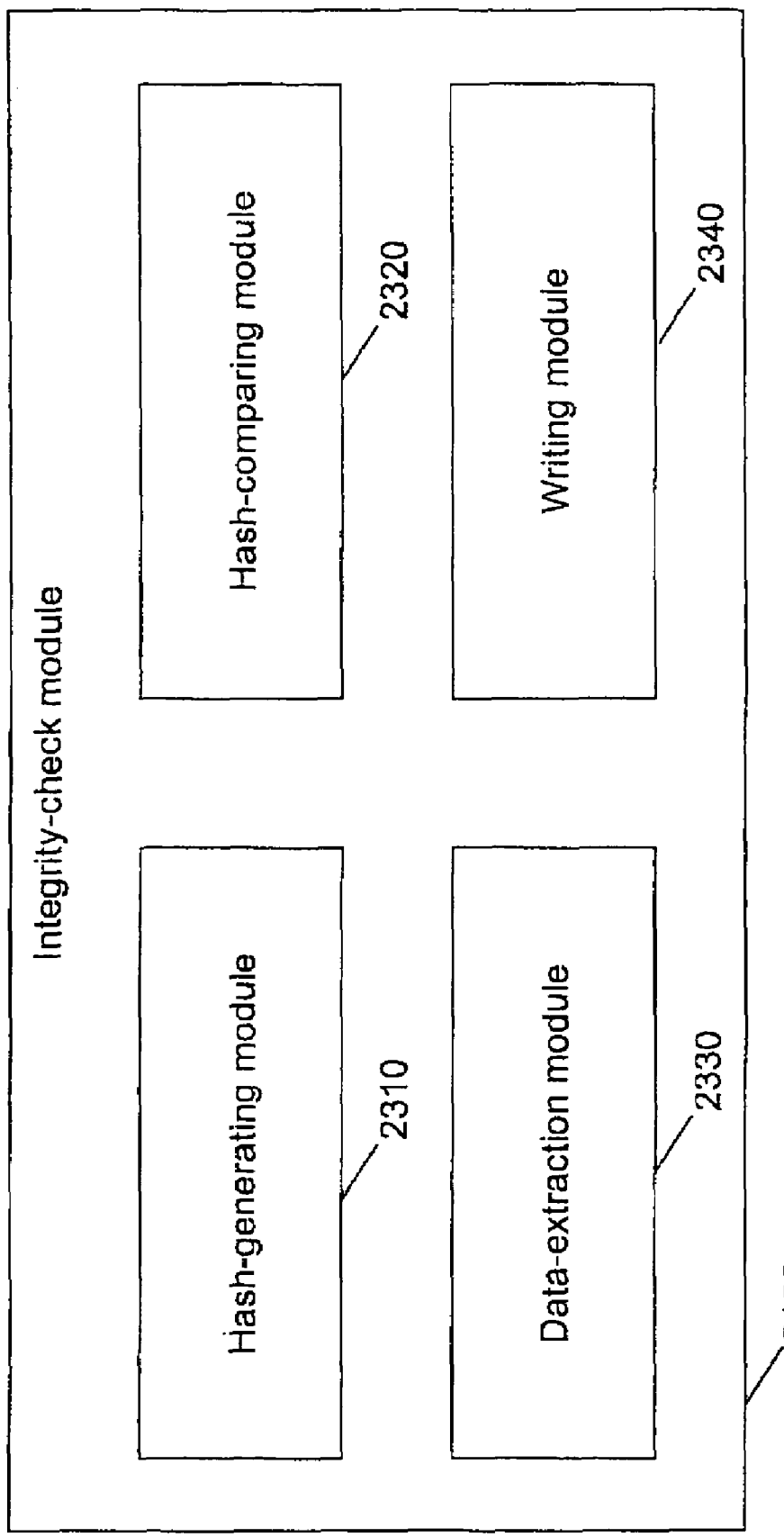
FIG. 23 is a diagram illustrating an integrity-check module in accordance with one embodiment.

Referring to FIG. 23, a diagram illustrating an integrity-check module is presented, in accordance with one embodiment of the present invention. In an embodiment of the present invention, integrity-check module 2120 includes a hash-generating module 2310, a hash-comparing module 2320, a data-extraction module 2330, and a writing module 2340. Hash-generating module 2310 generates a hash value for a selected portion of data. The hash value may be generated using any known technique for generating hash values. Hash-comparing module 2320 compares the generated hash value with a pre-determined hash value for the selected portion of data. In an embodiment of the invention, all data written, for example as fixed size segments or files, have hash values computed at the time of storage. Data-extraction module 2330 extracts the location of the original copy of the selected portion of data, in case the generated hash value is different from the pre-determined hash value. Writing module 2340 writes the extracted data on the selected storage device in place of the selected portion of data.

Various embodiments of the invention provide the following advantages. First, background processing of the data-enhancing operations results in the optimal utilization of the resources available. Second, background compression results in an improved storage efficiency, as more data can be stored in the available storage space. Third, integrity-check and reliability-check on the data results in better reliability of the stored data. Fourth, index-creation results in faster and more-efficient searches conducted on the storage device.

Although terms such as 'storage device,' 'disk drive,' etc., are used, any type of storage unit can be adapted for use with the present invention. For example, disk drives, magnetic drives, etc., can also be used. Different present and future storage technologies can be used, such as those created with magnetic, solid-state, optical, bioelectric, nano-engineered, or other techniques.

The system, as described in the present invention or any of its components, may be embodied in the form of a computer system. Typical examples of a computer system includes a general-purpose computer, a programmed micro-processor, a micro-controller, a peripheral integrated circuit element, and other devices or arrangements of devices that are capable of implementing the steps that constitute the method of the present invention.

Storage units can be located either internally inside a computer or outside it in a separate housing that is connected to the computer. Storage units, controllers, and other components of systems discussed herein can be included at a single location or separated at different locations. Such components can be interconnected by any suitable means, such as networks, communication links, or other technology. Although specific functionality may be discussed as operating at, or residing in or with, specific places and times, in general, it can be provided at different locations and times. For example, functionality such as data protection steps can be provided at different tiers of a hierarchical controller. Any type of RAID arrangement or configuration can be used.

In the description herein, numerous specific details are provided, such as examples of components and/or methods, to provide a thorough understanding of the embodiments of the present invention. One skilled in the relevant art will recognize, however, that an embodiment of the invention can be practiced without one or more of the specific details; or with other apparatus, systems, assemblies, methods, components, materials, parts, and/or the like. In other instances, well-known structures, materials, or operations are not specifically shown or described in detail, to avoid obscuring aspects of the embodiments of the present invention.

A 'processor' or 'process' includes any human, hardware and/or software system, mechanism, or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in 'real time,' 'offline,' in a 'batch mode,' etc. Moreover, certain portions of processing can be performed at different times and at different locations, by different (or the same) processing systems.

Reference throughout this specification to 'one embodiment', 'an embodiment', or 'a specific embodiment' means that a particular feature, structure or characteristic, described in connection with the embodiment, is included in at least one embodiment of the present invention and not necessarily in all the embodiments. Therefore, the use of these phrases in various places throughout the specification does not imply that they are necessarily referring to the same embodiment. Further, the particular features, structures, or characteristics of any specific embodiment of the present invention may be combined in any suitable manner with one or more other embodiments. It is to be understood that other variations and modifications of the embodiments of the present invention, described and illustrated herein, are possible in light of the teachings herein, and are to be considered as a part of the spirit and scope of the present invention.

It will also be appreciated that one or more of the elements depicted in the drawings/figures can also be implemented in a more separated or integrated manner, or even removed or rendered as inoperable in certain cases, as is required, in accordance with a particular application. It is also within the spirit and scope of the present invention to implement a program or code that can be stored in a machine-readable medium, to permit a computer to perform any of the methods described above.

Additionally, any signal arrows in the drawings/figures should be considered only as exemplary, and not limiting, unless otherwise specifically noted. Further, the term 'or', as used herein, is generally intended to mean 'and/or' unless otherwise indicated. Combinations of the components or steps will also be considered as being noted, where terminology is foreseen as rendering unclear the ability to separate or combine.

As used in the description herein and throughout the claims that follow, 'a', 'an', and 'the' includes plural references unless the context clearly dictates otherwise. In addition, as used in the description herein and throughout the claims that follow, the meaning of 'in' includes 'in' and 'on', unless the context clearly dictates otherwise.

The foregoing description of the illustrated embodiments of the present invention, including what is described in the Abstract, is not intended to be exhaustive or limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention, in light of the foregoing description of the illustrated embodiments of the present invention, and are to be included within the spirit and scope of the present invention.

The benefits and advantages, which may be provided by the present invention, have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations, which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for processing data on a particular storage device in a plurality of storage devices, the method comprising:
   determining a power budget of a maximum number of storage devices in the plurality of storage devices that can be powered on at one time, wherein not all of the plurality of storage devices are powered on at one time;
   determining if power consumption is above the power budget;
   selecting a data enhancing operation for data on the particular storage device if the power consumption is not above the power budget; and
   performing the data enhancing operation on the particular storage device.

2. A system for processing data on a particular storage device in a plurality of storage devices, the system comprising:
   means for determining a power budget of a maximum number of storage devices in the plurality of storage devices that can be powered on at one time, wherein not all of the plurality of storage devices are powered on at one time;
   means for determining if power consurnpfon is above the power budget;
   means for selecting a data enhancing operation for data on the particular storage device if the power consumption is not above the power budget; and;
   means for performing the data enhancing operation on the particular storage device.

3. A computer-readable medium including instructions executable by a processor processing data on a particular storage device in a plurality of storage devices, the computer-readable medium comprising:
   one or more instructions for determining a power budget of a maximum number of storage devices in the plurality of storage devices that can be powered on at one time, wherein not all of the plurality of storage devices are powered on at one time;
   one or more instructions for determining if power consumption is above the power budget;
   one or more instructions for selecting a data enhancing operation for data on the particular storage device if the power consumption is not above the power budget; and;
   one or more instructions for performing the data enhancing operation on the particular storage device.

4. An apparatus for processing data on a particular storage device in a plurality of storage devices, the apparatus comprising:
   a processor for executing instructions; and
   a machine-readable medium including:
   one or more instructions for determining a power budget of a maximum number of storage devices in the plurality of storage devices that can be powered on at one time, wherein not all of the plurality of storage devices are powered on at one time;
   one or more instructions for determining if power consumption is above the power budget;
   one or more instructions for selecting a data enhancing operation for data on the particular storage device if the power consumption is not above the power budget; and;
   one or more instructions for performing the data enhancing operation on the particular storage device.

5. The method of claim 1, further comprising:
   determining if the particular storage device is powered off when the processing power is not above the power budget; and
   powering on the particular storage device if the particular storage device is powered off to perform the data enhancing operation.

6. The method of claim 1, wherein the power budget is based on a maximum number of storage devices that can be powered on at one time.

7. The method of claim 6, wherein determining if processing power is above the power budget comprises comparing a number of powered on storage devices to the maximum number of storage devices that can be powered on at one time.

8. The method of claim 1, wherein determining if power consumption is above the power budget comprises:
   determining a current total power consumption of powered on storage devices; and
   predicting an anticipated power consumption of the particular storage device; and using the current total power consumption and the anticipated power consumption to determine if the power consumption is above the power budget.

9. The method of claim 1, wherein the data enhancing operation is not performed if the power consumption is above the power budget.

10. The method of claim 1, wherein if the processing power is not above the power budget, real-time operations are not using all of the processing power allotted to the power budget.

11. The method of claim 1, wherein the data enhancing operation is performed as a background operation such that real-time operations are not affected by the performing of the background operation.

12. The system of claim 2, further comprising:
  means for determining if the particular storage device is powered off when the processing power is not above the power budget; and
  means for powering on the particular storage device if the particular storage device is powered off to perform the data enhancing operation.

13. The system of claim 2, wherein the power budget is based on a maximum number of storage devices that can be powered on at one time.

14. The system of claim 13, wherein the means for determining if processing power is above the power budget comprises means for comparing a number of powered on storage devices to the maximum number of storage devices that can be powered on at one time.

15. The system of claim 2, wherein the means for determining if power consumption is above the power budget comprise:
  means for determining a current total power consumption of powered on storage devices; and
  means for predicting an anticipated power consumption of the particular storage device; and
  means for using the current total power consumption and the anticipated power consumption to determine if the power consumption is above the power budget.

16. The system of claim 2, wherein the data enhancing operation is not performed if the power consumption is above the power budget.

17. The system of claim 2, wherein if the processing power is not above the power budget, real-time operations are not using all of the processing power allotted to the power budget.

18. The system of claim 2, wherein the data enhancing operation is performed as a background operation such that real-time operations are not affected by the performing of the background operation.

19. The computer-readable medium of claim 3, further comprising:
  one or more instructions for determining if the particular storage device is powered off when the processing power is not above the power budget; and
  one or more instructions for powering on the particular storage device if the particular storage device is powered off to perform the data enhancing operation.

20. The computer-readable medium of claim 3, wherein the power budget is based on a maximum number of storage devices that can be powered on at one time.

21. The computer-readable medium of claim 20, wherein the one or more instructions for determining if processing power is above the power budget comprise one or more instructions for comparing a number of powered on storage devices to the maximum number of storage devices that can be powered on at one time.

22. The computer-readable medium of claim 3, wherein the one or more instructions for determining if power consumption is above the power budget comprises:
  one or more instructions for determining a current total power consumption of powered on storage devices; and
  one or more instructions for predicting an anticipated power consumption of the particular storage device; and
  one or more instructions for using the current total power consumption and the anticipated power consumption to determine if the power consumption is above the power budget.

23. The computer-readable medium of claim 3, wherein the data enhancing operation is not performed if the power consumption is above the power budget.

24. The computer-readable medium of claim 3, wherein if the processing power is not above the power budget, real-time operations are not using all of the processing power allotted to the power budget.

25. The computer-readable medium of claim 3, wherein the data enhancing operation is performed as a background operation such that real-time operations are not affected by the performing of the background operation.

* * * * *